(12) United States Patent
Sharpin et al.

(10) Patent No.: US 12,025,408 B2
(45) Date of Patent: Jul. 2, 2024

(54) METHODS AND APPARATUSES FOR ACTIVE PROTECTION FROM AERIAL THREATS

(71) Applicant: Northrop Grumman Systems Corporation, Plymouth, MN (US)

(72) Inventors: David Sharpin, Simi Valley, CA (US); James Kolanek, Goleta, CA (US); Mark A. Cvetnic, Chaska, MN (US); Mike Hutchings, Newbury Park, CA (US); James Tennison, Ventura, CA (US); Kent Carl Nelson, Simi Valley, CA (US); Harold Kregg Hunsberger, Simi Valley, CA (US); Behshad Baseghi, Santa Barbara, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 227 days.

(21) Appl. No.: 17/202,734

(22) Filed: Mar. 16, 2021

(65) Prior Publication Data
US 2022/0026180 A1 Jan. 27, 2022

Related U.S. Application Data

(63) Continuation of application No. 16/411,781, filed on May 14, 2019, now Pat. No. 10,982,935, which is a
(Continued)

(51) Int. Cl.
*F41H 11/02* (2006.01)
*F41G 7/00* (2006.01)
(Continued)

(52) U.S. Cl.
CPC .............. *F41H 11/02* (2013.01); *F41G 7/00* (2013.01); *F42B 10/14* (2013.01); *F42B 10/26* (2013.01);
(Continued)

(58) Field of Classification Search
None
See application file for complete search history.

(56) References Cited

U.S. PATENT DOCUMENTS

| 3,231,223 A | 1/1966 | Upper |
| 3,350,886 A | 11/1967 | Adrien et al. |

(Continued)

FOREIGN PATENT DOCUMENTS

| DE | 112005000582 T5 | 2/2007 |
| EP | 0418636 A2 | 3/1991 |

(Continued)

OTHER PUBLICATIONS

"Trophy: Active Protection and Hostile Fire Detection System for Armored Vehicles"; no author given; copyright in the year 2022; posted at www.leonardodrs.com. (Year: 2022).*

(Continued)

*Primary Examiner* — Bernarr E Gregory
(74) *Attorney, Agent, or Firm* — TraskBritt

(57) ABSTRACT

Embodiments include active protection systems and methods for an aerial platform. An onboard system includes one or more radar modules, detects aerial vehicles within a threat range of the aerial platform, and determines if any of the plurality of aerial vehicles are an aerial threat. The onboard system also determines an intercept vector to the aerial threat, communicates the intercept vector to an eject vehicle, and causes the eject vehicle to be ejected from the aerial platform to intercept the aerial threat. The eject vehicle includes a rocket motor to accelerate the eject vehicle along an intercept vector, alignment thrusters to rotate a longitudinal axis of the eject vehicle to substantially align with the intercept vector, and divert thrusters to divert the eject vehicle in a direction substantially perpendicular to the
(Continued)

intercept vector. The eject vehicle activates at least one of the alignment thrusters responsive to the intercept vector.

43 Claims, 14 Drawing Sheets

Related U.S. Application Data continuation of application No. 14/922,711, filed on Oct. 26, 2015, now Pat. No. 10,295,312, which is a continuation of application No. 13/455,831, filed on Apr. 25, 2012, now Pat. No. 9,170,070.

(60) Provisional application No. 61/606,010, filed on Mar. 2, 2012.

(51) Int. Cl.
*F42B 10/14* (2006.01)
*F42B 10/26* (2006.01)
*F42B 10/66* (2006.01)
*F42B 15/01* (2006.01)
*G06T 7/246* (2017.01)

(52) U.S. Cl.
CPC ............ *F42B 10/661* (2013.01); *F42B 15/01* (2013.01); *G06T 7/246* (2017.01)

(56) References Cited

U.S. PATENT DOCUMENTS

| | | |
|---|---|---|
| 3,612,442 A | 10/1971 | Chisel |
| 3,614,027 A | 10/1971 | Lewis |
| 3,624,367 A | 11/1971 | Hamilton et al. |
| 3,667,044 A | 5/1972 | Vaughan et al. |
| 3,693,909 A | 9/1972 | Hall |
| 3,732,693 A | 5/1973 | Chu |
| 3,735,944 A | 5/1973 | Bannett et al. |
| 3,788,069 A | 1/1974 | Schmidt |
| 3,802,190 A | 4/1974 | Kaufmann |
| 3,808,940 A | 5/1974 | Schillreff et al. |
| 3,841,585 A | 10/1974 | Evers |
| 3,850,103 A | 11/1974 | Krupen |
| 3,926,390 A | 12/1975 | Teuber et al. |
| 3,986,682 A | 10/1976 | Dryden |
| 4,008,869 A | 2/1977 | Weiss |
| 4,063,485 A | 12/1977 | Carter et al. |
| 4,093,153 A | 6/1978 | Bardash et al. |
| 4,332,360 A | 6/1982 | Topliffe |
| 4,408,735 A | 10/1983 | Metz |
| 4,470,562 A | 9/1984 | Hall et al. |
| 4,482,107 A | 11/1984 | Metz |
| 4,568,940 A | 2/1986 | Diamond |
| 4,635,880 A | 1/1987 | Jehle |
| 4,762,293 A | 8/1988 | Waddington |
| 4,848,706 A | 7/1989 | Garg et al. |
| 4,925,129 A | 5/1990 | Salkeld et al. |
| 4,967,982 A | 11/1990 | Bagley |
| 5,054,712 A | 10/1991 | Bar et al. |
| 5,062,593 A | 11/1991 | Goddard et al. |
| 5,071,087 A | 12/1991 | Gray |
| 5,082,200 A | 1/1992 | Gray |
| 5,114,094 A | 5/1992 | Harris |
| 5,118,050 A | 6/1992 | Arnold et al. |
| 5,129,604 A | 7/1992 | Bagley |
| 5,211,356 A | 5/1993 | Mcwilliams et al. |
| 5,238,204 A | 8/1993 | Metz |
| 5,259,569 A | 11/1993 | Waymeyer et al. |
| 5,379,966 A | 1/1995 | Simeone et al. |
| 5,456,425 A | 10/1995 | Morris et al. |
| 5,456,429 A | 10/1995 | Mayersak |
| 5,478,028 A | 12/1995 | Snyder |
| 5,533,331 A | 7/1996 | Campbell et al. |
| 5,631,830 A | 5/1997 | Schroeder |
| 5,828,571 A | 10/1998 | Bessacini et al. |
| 5,855,339 A | 1/1999 | Mead et al. |
| 5,917,442 A | 6/1999 | Manoogian |
| 6,135,393 A | 10/2000 | Sackheim et al. |
| 6,179,246 B1 | 1/2001 | Fisel et al. |
| 6,209,820 B1 | 4/2001 | Golan et al. |
| 6,231,002 B1 | 5/2001 | Hibma et al. |
| 6,231,003 B1 | 5/2001 | Hibma et al. |
| 6,267,326 B1 | 7/2001 | Smith et al. |
| RE37,331 E | 8/2001 | Schroeder |
| 6,289,669 B1 | 9/2001 | Smirra |
| 6,302,354 B1 | 10/2001 | Patera |
| 6,347,763 B1 | 2/2002 | Harkins et al. |
| 6,360,986 B1 | 3/2002 | Larcher et al. |
| 6,455,828 B1 | 9/2002 | Gauggel et al. |
| 6,565,036 B1 | 5/2003 | Palathingal et al. |
| 6,588,700 B2 | 7/2003 | Moore et al. |
| 6,603,421 B1 | 8/2003 | Schiff et al. |
| 6,610,971 B1 | 8/2003 | Crabtree |
| 6,629,668 B1 | 10/2003 | Grau et al. |
| 6,630,902 B1 | 10/2003 | Fenton et al. |
| 6,672,533 B1 | 1/2004 | Regebro |
| 6,717,543 B2 | 4/2004 | Pappert et al. |
| 6,889,935 B2 | 5/2005 | O'Dwyer |
| 6,920,827 B2 | 7/2005 | Llyod |
| 6,926,576 B1 | 8/2005 | Alway et al. |
| 7,004,423 B2 | 2/2006 | Folsom et al. |
| 7,102,113 B2 | 9/2006 | Fujita et al. |
| 7,239,377 B2 | 7/2007 | Vermillion et al. |
| 7,249,730 B1* | 7/2007 | Flippen, Jr. ............ F42B 15/01 342/61 |
| 7,269,920 B2 | 9/2007 | Staley, III |
| 7,277,046 B2 | 10/2007 | Adams et al. |
| 7,287,725 B2 | 10/2007 | Chasman et al. |
| 7,416,154 B2 | 8/2008 | Bittle et al. |
| 7,494,089 B2 | 2/2009 | Williams et al. |
| 7,654,185 B1 | 2/2010 | Yannone |
| 7,658,031 B2 | 2/2010 | Cross et al. |
| 7,714,261 B2 | 5/2010 | Bnayahu et al. |
| 7,832,137 B2 | 11/2010 | Sammut et al. |
| 7,851,732 B2 | 12/2010 | Brinkerhoff et al. |
| 7,875,838 B1 | 1/2011 | Starken |
| 7,886,646 B2 | 2/2011 | Bannasch et al. |
| 7,899,644 B2 | 3/2011 | Weber et al. |
| 7,977,614 B2 | 7/2011 | Raviv |
| 7,989,743 B2 | 8/2011 | Brinkerhoff et al. |
| 8,020,482 B1 | 9/2011 | Mccants, Jr. |
| 8,084,724 B1 | 12/2011 | Brosch et al. |
| 8,084,725 B1 | 12/2011 | Dryer |
| 8,084,726 B2 | 12/2011 | Hanlon et al. |
| 8,089,033 B2 | 1/2012 | Zank et al. |
| 8,157,169 B2 | 4/2012 | Olden et al. |
| 8,173,946 B1 | 5/2012 | Patterson et al. |
| 8,242,422 B2 | 8/2012 | Olden et al. |
| 8,338,768 B2 | 12/2012 | Hanlon et al. |
| 8,423,336 B2 | 4/2013 | Bennett et al. |
| 8,436,283 B1 | 5/2013 | Tournes et al. |
| 8,464,949 B2 | 6/2013 | Namey et al. |
| 8,575,526 B1 | 11/2013 | Colvin et al. |
| 8,584,443 B1 | 11/2013 | Carlson |
| 8,735,788 B2 | 5/2014 | Preston et al. |
| 8,757,486 B2 | 6/2014 | Cook et al. |
| 8,800,913 B2 | 8/2014 | Pagliara et al. |
| 8,809,755 B1 | 8/2014 | Patel et al. |
| 9,170,070 B2 | 10/2015 | Sharpin et al. |
| 9,501,055 B2 | 11/2016 | Kolanek et al. |
| 9,551,552 B2 | 1/2017 | Kolanek et al. |
| 10,295,312 B2 | 5/2019 | Sharpin et al. |
| 10,436,554 B2 | 10/2019 | Kolanek et al. |
| 11,313,650 B2 | 4/2022 | Kolanek et al. |
| 2003/0210170 A1 | 11/2003 | Krikorian et al. |
| 2005/0103925 A1 | 5/2005 | Folsom et al. |
| 2005/0184192 A1 | 8/2005 | Schneider |
| 2006/0238403 A1 | 10/2006 | Golan et al. |
| 2006/0283317 A1 | 12/2006 | Melnychuk et al. |
| 2007/0063095 A1 | 3/2007 | Bittle et al. |
| 2007/0169616 A1 | 7/2007 | Vickroy |
| 2009/0001214 A1 | 1/2009 | Williams et al. |
| 2010/0026554 A1 | 2/2010 | Longman et al. |

(56) References Cited

U.S. PATENT DOCUMENTS

| | | |
|---|---|---|
| 2010/0162915 A1 | 7/2010 | Rastegar |
| 2010/0275576 A1 | 11/2010 | Gutman et al. |
| 2010/0282892 A1 | 11/2010 | Hanlon et al. |
| 2010/0313741 A1 | 12/2010 | Smogitel |
| 2011/0029160 A1 | 2/2011 | Pagliara et al. |
| 2011/0049289 A1 | 3/2011 | Kinsey et al. |
| 2011/0082604 A1 | 4/2011 | Lam |
| 2011/0101097 A1 | 5/2011 | Olden et al. |
| 2011/0120294 A1 | 5/2011 | Beach et al. |
| 2011/0127328 A1 | 6/2011 | Warren |
| 2011/0174917 A1 | 7/2011 | Dold et al. |
| 2011/0196551 A1 | 8/2011 | Lees et al. |
| 2012/0091252 A1 | 4/2012 | Zaetterqvist |
| 2012/0199690 A1 | 8/2012 | Rastegar et al. |
| 2012/0211596 A1 | 8/2012 | Preston et al. |
| 2012/0248237 A1 | 10/2012 | Dolphin |
| 2014/0138474 A1 | 5/2014 | Sharpin et al. |
| 2014/0303884 A1 | 10/2014 | Levien et al. |

FOREIGN PATENT DOCUMENTS

| | | |
|---|---|---|
| EP | 0471225 A2 | 2/1992 |
| EP | 2624011 A1 | 8/2013 |
| FR | 2444253 A3 | 7/1980 |
| FR | 2674621 A1 | 10/1992 |
| GB | 2265342 A | 9/1993 |
| JP | 07-334244 A | 12/1995 |
| JP | 2005-155953 A | 6/2005 |
| JP | 5491877 B2 | 5/2014 |
| WO | 03/94292 A1 | 11/2003 |
| WO | 2005/098346 A1 | 10/2005 |
| WO | 2006/079029 A2 | 7/2006 |
| WO | 2008/035338 A2 | 3/2008 |
| WO | 2009/045573 A1 | 4/2009 |
| WO | 2010/036418 A2 | 4/2010 |
| WO | 2010/147520 A1 | 12/2010 |
| WO | 2011/028304 A1 | 3/2011 |

OTHER PUBLICATIONS

International Search Report for International Application No. PCT/US2013/027898, dated Jun. 5, 2013, 5 pages.

Written Opinion of the International Search Authority, ISA/EP, for Application No. PCT/US2013/027898, dated Jun. 5, 2013, 6 pages.

\* cited by examiner

METHODS AND APPARATUSES FOR ACTIVE PROTECTION FROM AERIAL THREATS

CROSS-REFERENCE TO RELATED APPLICATIONS

This is a continuation application of U.S. patent application Ser. No. 16/411,781, filed May 14, 2019, now U.S. Pat. No. 10,982,935, issued Apr. 20, 2021, which is a continuation of U.S. patent application Ser. No. 14/922,711, filed Oct. 26, 2015, now U.S. Pat. No. 10,295,312 issued May 21, 2019, which is a continuation of U.S. patent application Ser. No. 13/455,831, filed Apr. 25, 2012, now U.S. Pat. No. 9,170,070 issued Oct. 27, 2015, which application claims the benefit of U.S. Provisional Patent Application Ser. No. 61/606,010, filed Mar. 2, 2012, the disclosure of each of which is hereby incorporated herein in their entirety by this reference. This application is also related to U.S. patent application Ser. No. 13/839,176, filed Mar. 15, 2013, now U.S. Pat. No. 9,501,055, issued Nov. 22, 2016, and U.S. patent application Ser. No. 13/839,637, filed Mar. 15, 2013, now U.S. Pat. No. 9,551,552, issued Jan. 24, 2017, U.S. patent application Ser. No. 15/355,839, filed Nov. 18, 2016, now U.S. Pat. No. 10,228,689, U.S. patent application Ser. No. 15/411,324, filed Jan. 20, 2017, now U.S. Pat. No. 10,436,554, and PCT/US13/27898, published as WO2013/130518.

TECHNICAL FIELD

Embodiments of the present disclosure relate generally methods and apparatuses for active protection from a threat and, more particularly, to active protection systems for use with mobile platforms.

BACKGROUND

Rocket Propelled Grenades (RPGs) and other human carried projectiles such as Man-portable Air-Defense Systems (MANPADS or MPADS) and shoulder-launched Surface-to-Air Missiles (SAMs) represent serious threats to mobile land and aerial platforms. Even inexperienced RPG operators can engage a stationary target effectively from 150-300 meters, while experienced users could kill a target at up to 500 meters, and moving targets at 300 meters. One known way of protecting a platform against RPGs is often referred to as active protection and generally causes explosion or discharge of a warhead on the RPG at a safe distance away from the threatened platform. Another known protection approaches against RPGs and short range missiles are more passive and generally employ fitting the platform to be protected with armor (e.g., reactive armor, hybrid armor or slat armor).

Active Protection Systems (APS) have been proposed for ground vehicles for defense against RPGs and other rocket fired devices with a good success rate for quite some time. However, these systems are proposed to protect vehicles that are: 1) armored, 2) can carry heavy loads, and 3) have plenty of available space for incorporation of large critical systems. Currently these systems can weigh anywhere between 300 to 3000 lbs. and can protect the vehicle when intercepting incoming threats as close as 5 to 10 ft.

There is a need in the art for active protection systems for mobile aerial platforms, such as, for example, a helicopter, from an aerial threat, as well as for relatively lightweight, agile and unarmored or armored land vehicles. There is also a need for such systems to be portable and lightweight enough for carrying on aerial and other mobile platforms that may have significant weight and size constraints, or on which an active protection system may be easily installed. For some systems, there is a need to have an active protection system that can be incorporated into existing systems already installed on the platform in question.

BRIEF SUMMARY

Embodiments of the present disclosure include apparatuses and methods for providing protection for mobile platforms, such as, for example, a helicopter, from an aerial threat. Some embodiments of the present disclosure may include methods and apparatuses that are portable and lightweight enough for carrying on aerial platforms that may have significant weight and size constraints. Some embodiments of the present disclosure may include methods and apparatuses that can be incorporated into existing systems already installed on aerial platforms.

Embodiments of the present disclosure include an eject vehicle for disposition on a mobile platform. The eject vehicle includes a rocket motor configured to accelerate the eject vehicle along an intercept vector, a plurality of alignment thrusters configured to rotate a longitudinal axis of the eject vehicle to substantially align with the intercept vector, and one or more divert thrusters configured to divert the eject vehicle in a direction substantially perpendicular to the intercept vector.

Other embodiments of the present disclosure include a method of intercepting an aerial threat. The method includes ejecting an eject vehicle from an aerial platform and aligning the eject vehicle along an intercept vector substantially toward a projected intercept point with the aerial threat. The method also includes accelerating the eject vehicle along the intercept vector and diverting the eject vehicle from the intercept vector one or more times after commencement of accelerating the eject vehicle to adjust a course of the eject vehicle toward the projected intercept point.

Other embodiments of the present disclosure include an eject vehicle for disposition on an aerial platform. The eject vehicle includes a substantially cylindrical vehicle configured to be disposed within a substantially tubular dispenser previously configured for dispensing passive countermeasures from a helicopter as the aerial platform. The eject vehicle also includes an ejection mechanism configured to propel the eject vehicle from the substantially tubular dispenser. At least one thruster, at least one motor, or a combination thereof on the eject vehicle is configured to rotate a longitudinal axis of the eject vehicle to substantially align with an intercept vector and accelerate the eject vehicle along the intercept vector.

Still other embodiments of the present disclosure include an active protection system for an aerial platform. The active protection system includes one or more radar modules configured to detect a plurality of aerial vehicles within a threat range of the aerial platform and one or more dispensers. Each dispenser is configured to hold one or more eject vehicles. The active protection system also includes a computing system configured to determine if any of the plurality of aerial vehicles are an aerial threat and cause at least one of the one or more eject vehicles to be launched from the aerial platform to intercept the aerial threat. The computing system is also configured to determine an intercept vector to the aerial threat for use by the at least one eject vehicle after ejection from the one or more dispensers and communicate the intercept vector to the at least one eject vehicle.

Still other embodiments of the present disclosure include a method for active protection of an aerial platform. The method includes detecting an aerial threat within a threat range of the aerial platform and causing at least one eject vehicle to be launched from the aerial platform to intercept the aerial threat. The method also includes determining an intercept vector to the aerial threat for use by the at least one eject vehicle after its launch and communicating the intercept vector to the at least one eject vehicle prior to its launch.

Still other embodiments of the present disclosure include an active protection system for an aerial platform. The active protection system includes one or more eject vehicles and an onboard system on the aerial platform including one or more radar modules. Each of the eject vehicles include a rocket motor configured to accelerate the eject vehicle along an intercept vector, a plurality of alignment thrusters configured to rotate a longitudinal axis of the eject vehicle to substantially align with the intercept vector, and one or more divert thrusters configured to divert the eject vehicle in a direction substantially perpendicular to the intercept vector. The onboard system is configured to detect a plurality of aerial vehicles within a threat range of the aerial platform and determine if any of the plurality of aerial vehicles are an aerial threat. The onboard system is also configured to determine the intercept vector to the aerial threat, communicate the intercept vector to at least one eject vehicle, and cause the at least one eject vehicle to be ejected from the aerial platform to intercept the aerial threat. In the active protection system, the at least one eject vehicle is configured to activate at least one of the plurality of alignment thrusters responsive to the intercept vector.

DETAILED DESCRIPTION

Figures 1A, 1B:
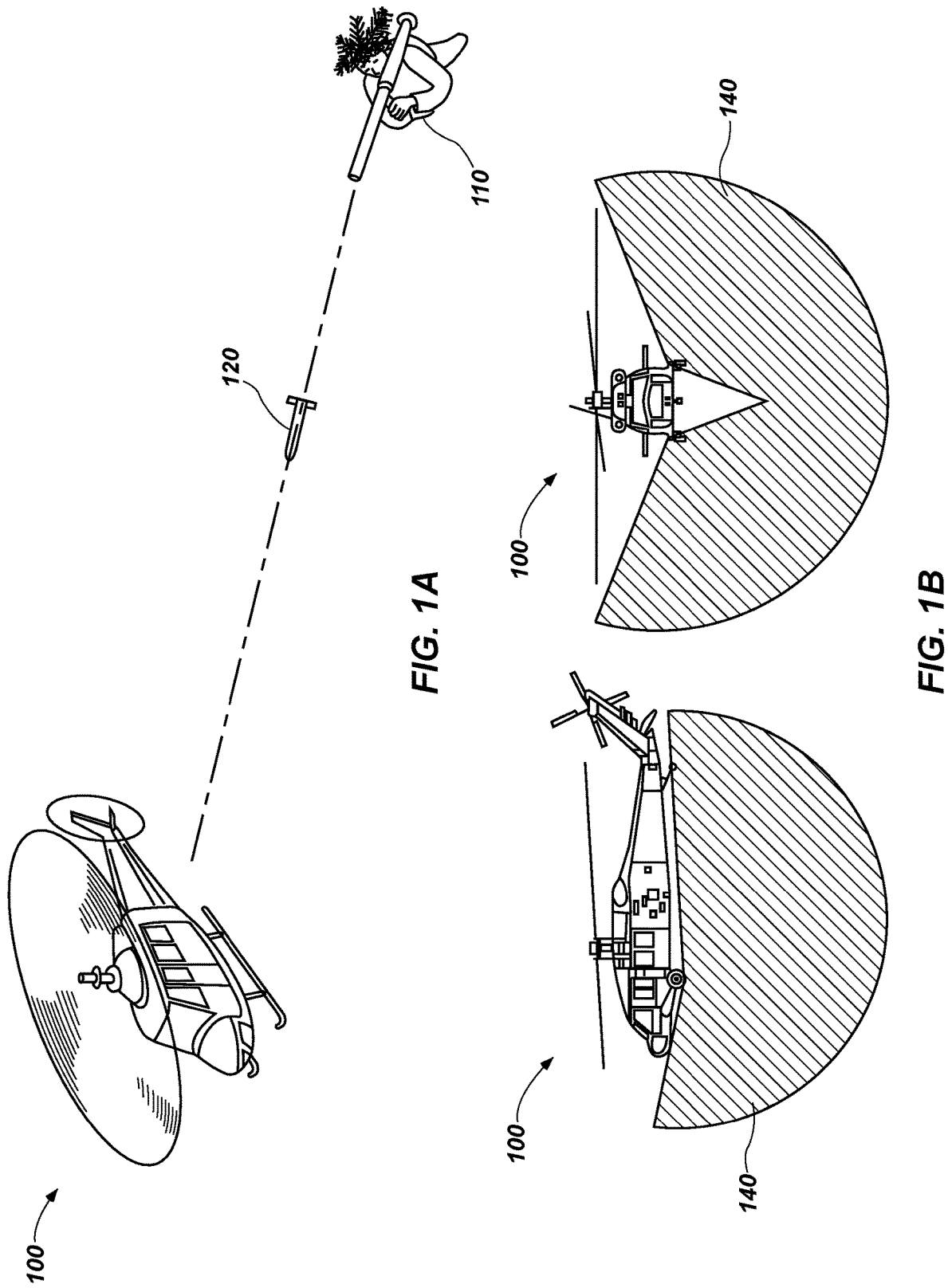
FIGS. 1A and 1B illustrate a helicopter as an aerial platform that may be under attack from an aerial threat and coverage areas that may be employed to sense when such a threat is present.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor is configured to execute instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

In addition, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be rearranged.

Figure 3:
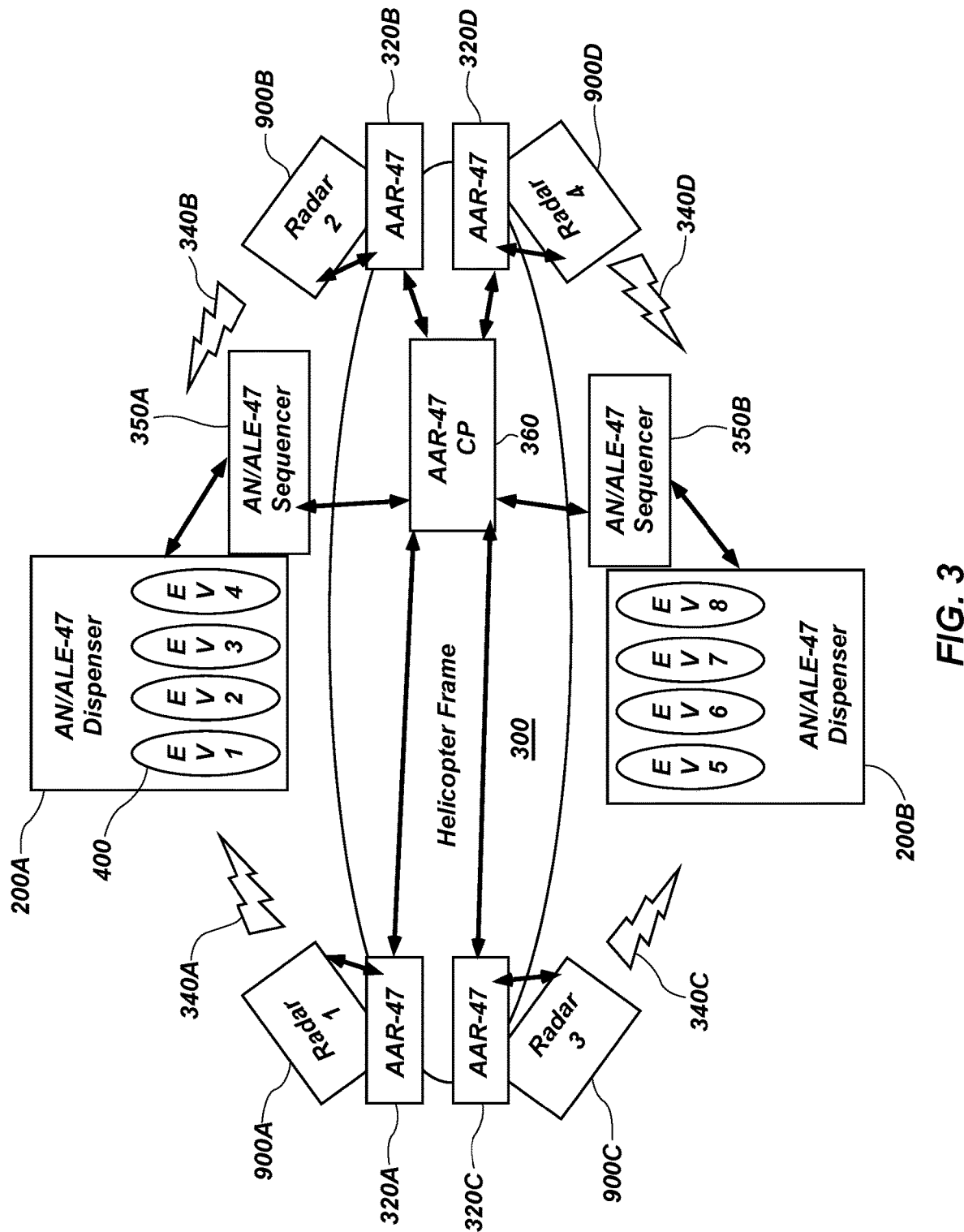
FIG. 3 illustrates systems that may be present on a helicopter and that may intercommunicate according to one or more embodiments of the present disclosure.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the present disclosure include apparatuses and methods for providing protection for mobile platforms, such as, for example, a helicopter, from an aerial threat. Some embodiments of the present disclosure may include methods and apparatuses that are portable and lightweight enough for carrying on aerial platforms that may have significant weight and size constraints. Some embodiments of the present disclosure may include methods and apparatuses that can be incorporated into existing systems already installed on aerial platforms.

FIGS. 1A and 1B illustrate a helicopter as an aerial platform 100 that may be under attack from an aerial threat 120 and coverage areas 140 that may be employed to sense when such a threat is present within an intercept range (may also be referred to herein as a threat range) of embodiments of the present disclosure. As shown in FIG. 1A, the aerial threat 120 may be shot by an attacker 110 toward the aerial platform 100.

As used herein, "aerial threat" or "threat" are used interchangeable to refer to any threat directed toward a mobile platform, including projectiles, rockets, and missiles that may be shoulder launched or launched from other platforms. As non-limiting examples, such aerial threats include Rocket Propelled Grenades (RPGs), Man-portable Air-Defense Systems (MANPADS or MPADS), shoulder-launched Surface-to-Air Missiles (SAMs) Tube-launched, Optically tracked, Wire-guided missiles (TOWs), and other aerial weapons, having a trajectory and ordnance such that they may cause damage to the mobile platform.

The term "aerial platform" includes, but is not limited to platform such as, helicopters, Unmanned Airborne Vehicle (UAVs), Remotely Piloted Vehicles (RPVs), light aircraft, hovering platforms, and low speed traveling platforms. The protection systems and methods of the present disclosure are particularly useful for protecting aerial platforms against many kinds of aerial threats.

While embodiments of the present disclosure may be particularly suitable for use on aerial platforms 100 due to the small size and weight, they may also be used in other types of mobile platforms like ground-based mobile platforms such as, for example, tanks, armored personnel carriers, personnel carriers (e.g., Humvee and Stryker vehicles) and other mobile platforms capable of bearing embodiments of the present disclosure. Moreover, embodiments of the present disclosure may be used for relatively stationary ground based personnel protection wherein a mobile platform may not be involved. Accordingly, embodiments of the disclosure are not limited to aerial applications.

FIG. 1B illustrates coverage areas 140 in which one or more embodiments of the present disclosure may detect an incoming aerial threat 120 and perform active countermeasures using one or more embodiments of the present invention to remove the aerial threat 120 before it can damage the aerial platform 100. Some embodiments of the present disclosure may be configured such that they can be disposed in previously existing Countermeasures Dispenser Systems (CMDS).

Figure 2A:
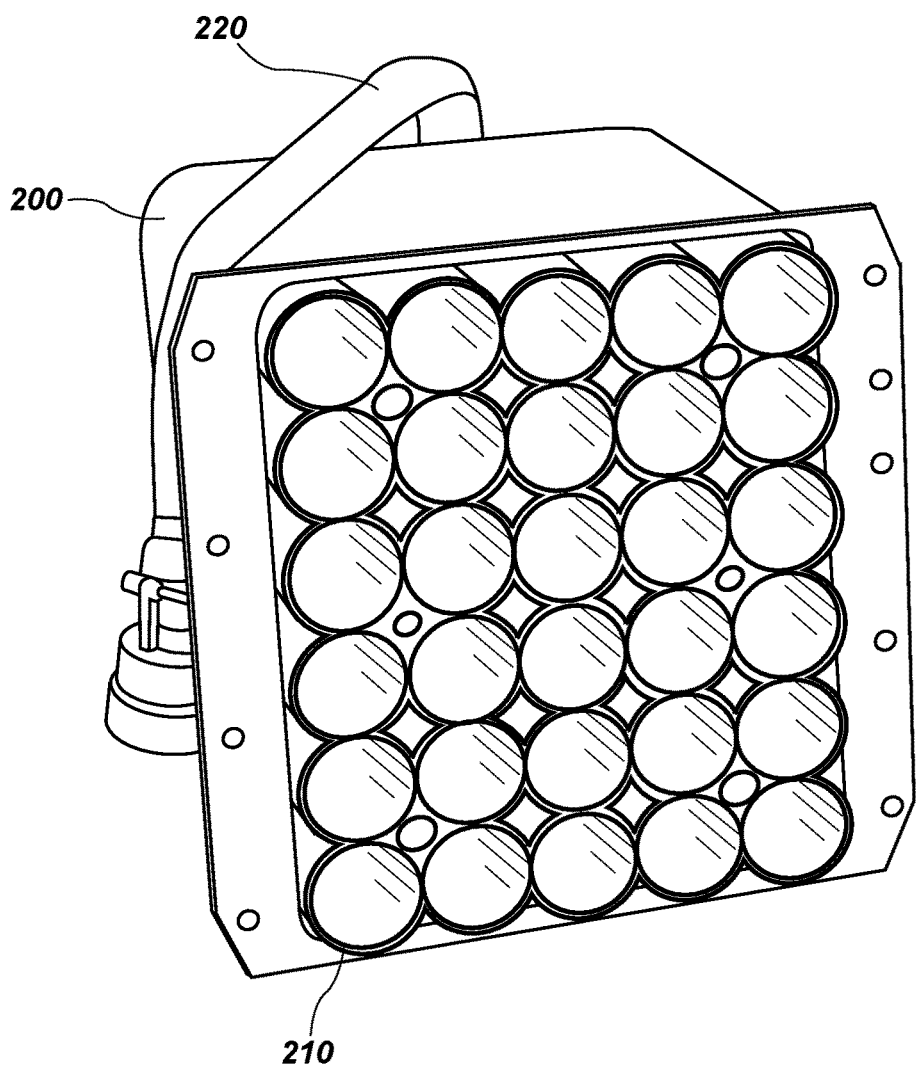
FIGS. 2A and 2B illustrate a conventional dispenser in which an eject vehicle 400 according to one or more embodiments of the present disclosure may be placed.
Figure 2B:
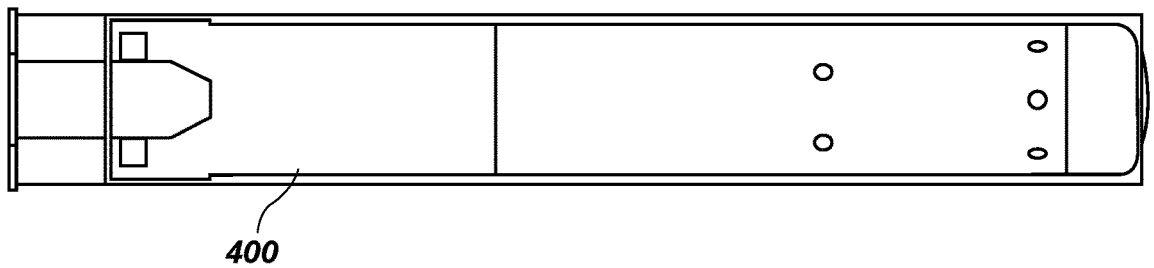

FIGS. 2A and 2B illustrate a dispenser 200 configured as a conventional CMDS (e.g., an AN/ALE-47) in which an eject vehicle 400 (EV) according to one or more embodiments of the present disclosure may be placed. AN/ALE-47 dispensers are conventionally used to dispense passive countermeasures, such as, for example, radar-reflecting chaff, infrared countermeasures to confuse heat-seeking missile guidance, and disposable radar transmitters. With some embodiments of the present disclosure, eject vehicles 400 may also be placed in the AN/ALE-47 and ejected therefrom under control of the AN/ALE-47 and other electronics on the aerial platform 100 (FIG. 1). The eject vehicle 400 may be configured as a substantially cylindrical vehicle to be placed in a tubular dispenser 210 and ejection may be controlled from control wiring 220 connected to the dispenser 200. Moreover, the dispenser 200 may be configured to hold both the passive countermeasures for which it was originally designed, as well as one or more eject vehicles 400 according to embodiments of the present disclosure.

While some embodiments of the eject vehicle 400 may be configured to be disposed in an AN/ALE-47, other types of dispensers 200 or other types of carriers for the eject vehicle 400 may also be used. Moreover, the tubular dispenser 210 is illustrated with a circular cross section. However, other cross sections may be used, such as, for example, square, hexagonal, or octagonal.

FIG. 3 illustrates systems that may be present on a helicopter frame 300 and that may intercommunicate according to one or more embodiments of the present disclosure. The helicopter frame 300 and systems described are used as specific examples to assist in giving details about embodiments of the present disclosure. In the specific example of FIG. 3, an AAR-47 Missile Approach Warning System (MAWS) warns of threat missile approaches by detecting radiation associated with the missile. In the specific example, four MAWSs (320A, 320B, 320C, and 320D) are disposed near four corners of the helicopter frame 300.

A central processor 360 may be used to control and coordinate the four MAWSs (320A, 320B, 320C, and 320D).

Two AN/ALE-47 dispensers (200A and 200B) are positioned on outboard sides of the helicopter frame 300, each of which may contain one or more eject vehicles 400. As shown in FIG. 3, there are four eject vehicles 400 on each side labeled EV1 through EV4 on one side and labeled EV5-EV8 on the other side. The AN/ALE-47 dispensers are each controlled by an AN/ALE-47 sequencer (350A and 350B), which are, in turn, controlled by the central processor 360.

According to one or more embodiments of the present disclosure four radar modules (900A, 900B, 900C, and 900D) are included to augment and connect with the AAR-47s and communicate with the eject vehicles 400. These radar modules 900 (See FIG. 9A) are configured to detect and track relatively small incoming aerial threats (e.g., an RPG) as well as the outgoing eject vehicles 400. Moreover, the radar modules 900 can send wireless communications (340A, 340B, 340C, and 340D) to the eject vehicles 400 both before and after they are ejected from the dispensers (200A and 200B). The radar modules 900, and eject vehicles 400 may each include unique identifiers, such as, for example, a Media Access Control (MAC) address. The radar modules 900 may also be configured to detect, track, and communicate with other friendly platforms such as, for example, other helicopters flying in formation with the helicopter. Thus, all helicopters within communication range can communicate and share radar and control information to form a broad coverage area, similar to cellular telephone base station coverage. Moreover, and as explained more fully below, the helicopters may communicate to define different sector coverage areas such that one helicopter does not launch an eject vehicle 400 into a sector that may damage or interfere with another helicopter.

The control processors, such as the central processor 360, the MAWSs 320, the radar modules 900, the sequencers 350A, 350B, and the dispensers 200 may be configured to form an ad hoc network and include the eject vehicles 400.

The specific example of FIG. 3 is shown to illustrate how radar modules (900A-900C) and eject vehicles (EV1-EV8) of the present disclosure can be incorporated with existing systems on helicopter platforms with little change. Of course, other systems may be employed with embodiments of the present disclosure. As a non-limiting example, one radar module 900A may be positioned on one side of the helicopter frame 300 and another radar module 900C may be positioned on another side of the helicopter frame. In such a case, the radar modules 900 would be configured to provide hemispherical coverage areas. These radar modules 900 may be controlled by, communicate with, or a combination thereof, a different central processor 360 configured specifically for embodiments of the present disclosure. Moreover, the eject vehicles 400 may be disposed in different carriers or different dispensers from the AN/ALE-47 dispensers (200A and 200B) shown in FIG. 3.

When embodiments of the present disclosure are used as illustrated in FIG. 3, they provide an ultra-light weight active protection system for helicopter platforms that may increase the survivability against RPG attacks to better than 90% for RPGs fired from ranges as close as about 100 meters away.

In order to satisfy the helicopter platform constraints, embodiments of the present disclosure address many significant technology areas:

1) For helicopter applications, size, weight, and power should be considered. Every pound of added airframe equipment will reduce capacity to carry personnel or cargo, and the space for adding equipment to the airframe may be at a premium. At least some embodiments of the present disclosure are configured to be less than about 50 pounds and occupy about 5.5"×5.5" surface area at each of the four corners of a helicopter exterior shell and with minimal impact to existing wiring kits.

2) Helicopters generally do not carry armor and thus, the intercept of an incoming threat (e.g., an RPG) must occur at a range that is safe to the un-armored helicopter airframe. Using an RPG-7 as an example, to achieve a survival probability of about 99% from the blast alone, the intercept should occur at distances beyond 30 meters from the helicopter shell. This requirement significantly influences the system response time, when considering that an RPG fired at a 100-meter distance may impact the helicopter in less than about 600 milliseconds.

3) A third concern is fratricide and collateral damage to friendly forces that may be amplified by the helicopter platform deploying kinetic countermeasures in a position above ground and potentially next to a wingman helicopter or in the vicinity of civilians, friendly troops, or a combination thereof. Some embodiments of the present disclosure are configured to work in combination with embodiments on other helicopters when the helicopters are flying in formation relatively close to each other.

4) Some embodiments of the present disclosure can geo-locate the attacker 110 (FIG. 1) after few radar track frames are processed.

5) Embodiments of the present disclosure can engage multiple threats at a time. In other words, multiple incoming aerial threats 120 can be detected and tracked and multiple outgoing eject vehicles 400 can be tracked. In addition, to increase a probability of destroying an incoming aerial threats 120, multiple eject vehicles 400 may be launched, directed toward, and detonated proximate the same aerial threat 120.

6) Finally, eject vehicles 400 can be launched and guided to the point of attack with the same or different warheads and detonated above the threat point of origin.

To address these technology areas, some embodiments of the present disclosures include an active kinetic countermeasure projectile (i.e., the eject vehicle 400 of FIG. 2) including an ejection mechanism with an impulse charge that can fit in, and can be launched by, the AN/ALE-47 chaff/flare dispenser 200. Some embodiments of the present disclosures include the radar module 900 covering a 90 degree sector or more (i.e., with a 90 degree sector each helicopter platform would use four radar modules 900).

When referring to the radar module 900 herein (e.g., as shown in FIGS. 1 and 3), it should be understood that in some embodiments the radar module 900 may perform the operations described herein in combination with other electronics and processors on the aerial platform 100. As such, the radar modules 900 may be used to: 1) search, acquire, and track incoming aerial threats 120, 2) launch the active kinetic countermeasure (i.e., eject vehicle 400), 3) track the outgoing eject vehicle 400 with respect to the incoming aerial threat 120, 4) point and guide the eject vehicle 400 toward the incoming aerial threat 120, 5) command detonate the eject vehicle 400, and 6) geo-locate the attacker 110, all in less than about one second. In one configuration, at least two AN/ALE-47 dispensers 200 would be used in conjunction with the four radar modules 900 such that each dispenser 200 provides hemispherical coverage.

The radar modules 900 may be configured as pulse Doppler radar modules 900 to scan the azimuth plane and the elevation plane using two orthogonal fan beams and may be configured to cover a 90 degree sector in about 20 milliseconds. Upon detecting an incoming aerial threat 120, the associated radar module 900 may then direct the launch and guidance of an eject vehicle 400 from an AN/ALE-47 dispenser 200 that covers that sector. The eject vehicle 400 may be command guided to the target by the radar module 900 and command detonated. The radar modules 900 may be configured as an addition to the existing AN/AAR-47 system and may use its existing interface for launching of the eject vehicle 400.

Some of the embodiments of the present disclosure may be configured to deploy an eject vehicle 400 that fits in a standard dispenser 200 but could be stabilized and pointed towards the threat after launch, in less than about 50 milliseconds, in the rotor downwash of a helicopter, and when ejected in the fixed direction dictated by the dispenser 200. The radar modules 900 may then guide the eject vehicle 400 to accurately intercept the aerial threat 120 within about 330 milliseconds and thus reduce the requirement of carrying a large warhead.

Figure 4:
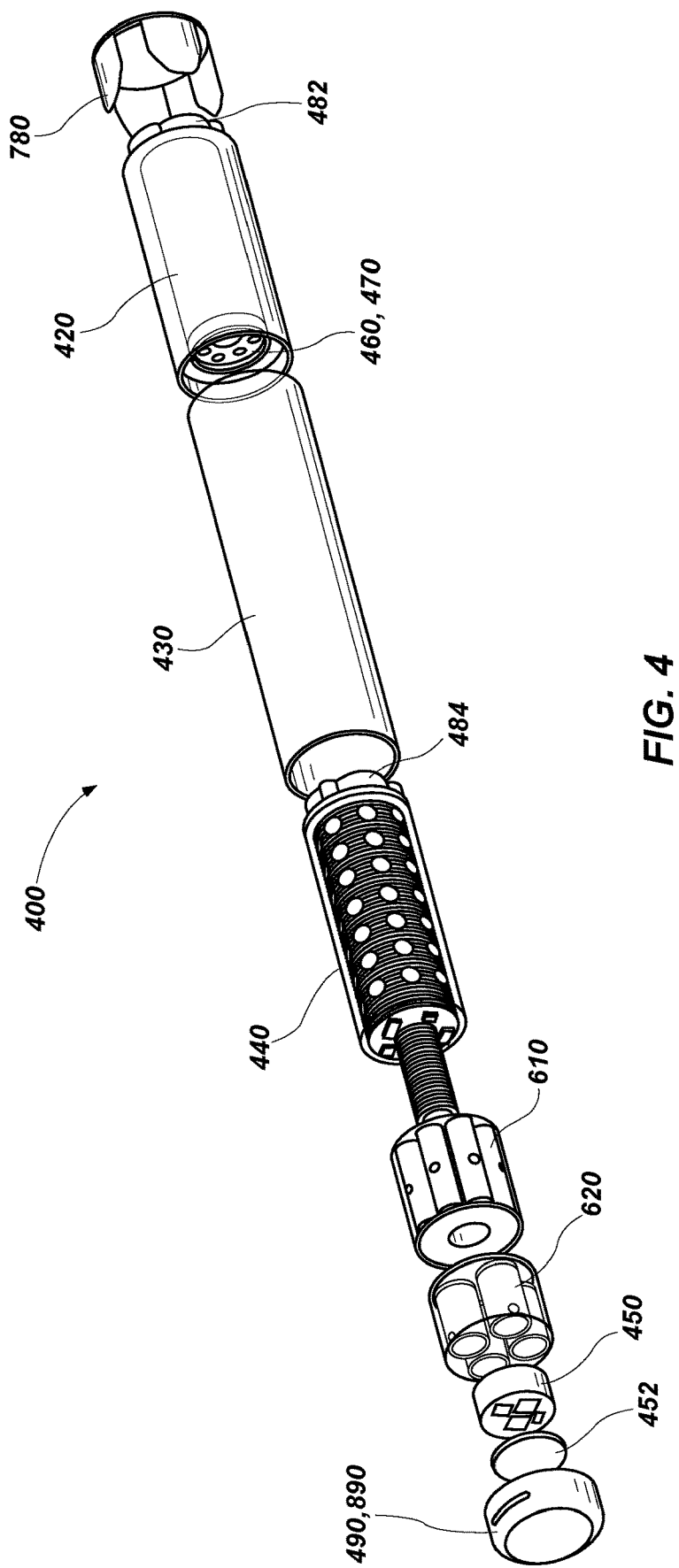
FIG. 4 illustrates an exploded view of an eject vehicle showing various elements of the EV according to one or more embodiments of the present disclosure.

FIG. 4 illustrates an exploded view of an eject vehicle 400 showing various elements of the eject vehicle 400 according to one or more embodiments of the present disclosure. Reference may also be made to FIGS. 1-3 in describing features and operations of the eject vehicle 400. The eject vehicle 400 is a lightweight guided projectile that, in some embodiments, may be designed to be launched from chaff/flare dispensers. The eject vehicle 400 may intercept and destroy incoming aerial threats 120 at ranges sufficient to prevent damage to the host aerial platform 100. The eject vehicle 400 may be packaged in a cartridge containing an impulse charge and interface electronics designed to fit the AN/ALE-47 dispenser magazine.

The eject vehicle 400 includes an ejection piston 780 configured to transmit the energy of an impulse cartridge 750 (described below in connection with FIG. 7) to the eject vehicle 400 and launch the eject vehicle 400 away from the aerial platform 100 to a distance safe enough for the eject vehicle 400 to begin performing alignment and interception maneuvers.

A rocket motor 420 may be used to propel the eject vehicle 400 toward the aerial threat 120 after the eject vehicle 400 has been rotated such that a longitudinal axis of the eject vehicle 400 is pointed in the general direction of the aerial threat 120. A first set of folding fins 482 may be attached to the rocket motor 420 and configured to deploy once the eject vehicle 400 has exited the dispenser 200. The folding fins 482 are small and configured to provide stability to the eject vehicle 400 during its flight path rather than as control surfaces for directing the fight path.

An airframe shell 430 may be configured to contain a warhead 440, a divert thruster module 610, a nose thruster module 620 (may also be referred to herein as an alignment thruster module 620), an electronics module 450, and a battery 452. An airframe nose 490 may be configured to attach to the airframe shell 430 to protect the electronics module 450 and provide a somewhat aerodynamic nose for the eject vehicle 400.

A safe and arm module 460 may be included within the airframe shell 430 and configured to safely arm the warhead 440 when the eject vehicle 400 is a safe distance away from the aerial platform 100.

Figure 5A:
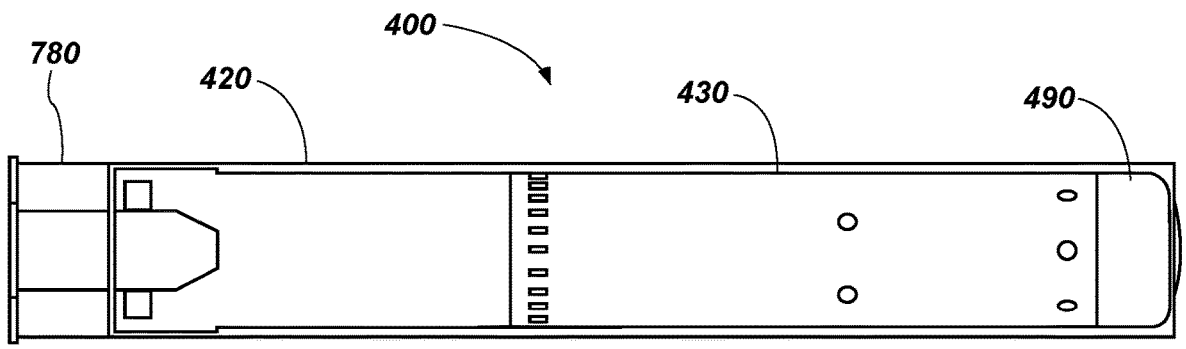
FIGS. 5A-5C illustrate the eject vehicle of FIG. 4 as it may be configured during various stages of an intercept mission according to one or more embodiments of the present disclosure.
Figure 5B:
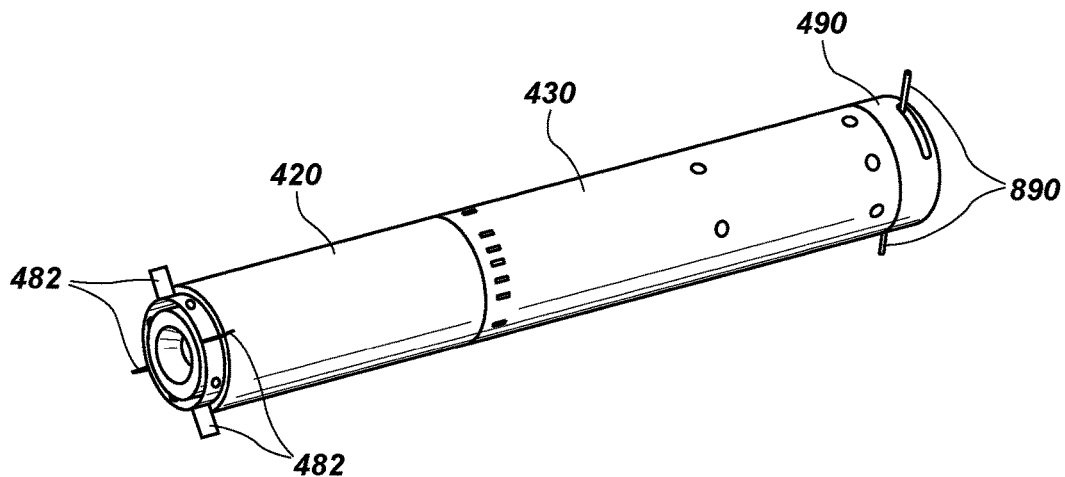
Figure 5C:
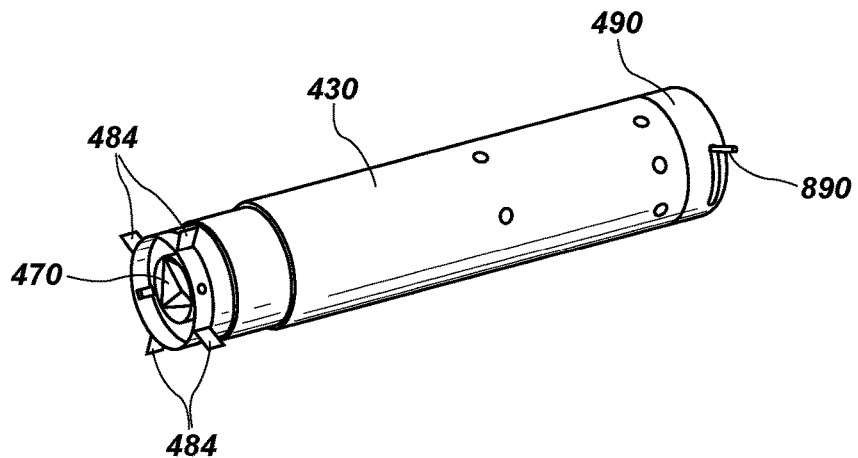

FIGS. 5A-5C illustrates the eject vehicle 400 of FIG. 4 as it may be configured during various stages of an intercept mission according to one or more embodiments of the present disclosure. Stage 1, in FIG. 5A, illustrates the eject vehicle 400 in the cartridge and including the ejection piston 780, the rocket motor 420, the airframe shell 430, and the airframe nose 490.

Stage 2, in FIG. 5B, illustrates the eject vehicle 400 after it has been dispensed and shows the rocket motor 420, the airframe shell 430, and the airframe nose 490. FIG. 5B also illustrates the folding fins 482 deployed near the end of the rocket motor 420 and wireless communication antennas 890 deployed near the airframe nose 490.

Stage 3, in FIG. 5C illustrates the eject vehicle 400 after the rocket motor 420 has burned and been detached from the airframe shell 430. At this stage, the eject vehicle 400 may be referred to as a terminal vehicle and includes the airframe nose 490, the wireless communication antennas 890, and the airframe shell 430. Still within the airframe shell 430 are the warhead 440, the divert thruster module 610, the alignment thruster module 620, the electronics module 450 the battery 452, and the safe and arm module 460. After the rocket motor 420 is detached, a second set of folding fins 484 are deployed from the airframe shell 430 to stabilize the eject vehicle 400 during the remainder of the flight to intercept the aerial threat 120. This second set of folding fins 484 are used to replace the first set of folding fins 482 that were attached to the rocket motor 420, which has been detached from the airframe shell 430 during stage 3.

In addition, after the rocket motor 420 is detached, one or more corner reflectors 470 are exposed. The corner reflector 470 may be configured with sharp angles to enhance radar detection of the eject vehicle 400 by a radar module 900 on the aerial platform 100. For example, the corner reflector 470 may be configured as an interior angle of a small cube shape, which will enhance radar detection.

Returning to FIG. 4, the alignment thruster module 620 is offset from a center of mass of the eject vehicle 400 such that an initial pitch maneuver can be performed to align the longitudinal axis of the eject vehicle 400 along an intercept vector pointed toward the aerial threat 120. This alignment maneuver is performed prior to the burn of the rocket motor 420.

The divert thruster module 610 is position substantially near a center of mass of the terminal vehicle and is used to laterally divert the terminal vehicle from its current flight path to make minor corrections to the flight path in order to more accurately intercept the aerial threat 120. The terminal vehicle may be referred to herein as the eject vehicle 400 and it should be understood what is being referred to based on the context of the discussion.

The warhead 440 may be command detonated when the radar module 900 on the aerial platform 100 determines that the eject vehicle 400 has reached the closest point of approach (nominally about 15 cm). The use of thrusters, provide the fast reaction times that may be needed to intercept the aerial threat 120 at a nominal distance of about 50 meters when the aerial threat 120 is launched from a range of about 100 meters.

Figure 6A:
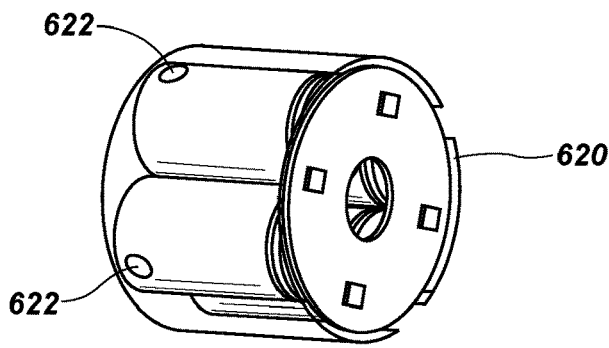
FIGS. 6A-6C illustrate various propulsion and thruster elements that may be included with one or more embodiments of the present disclosure.
Figure 6B:
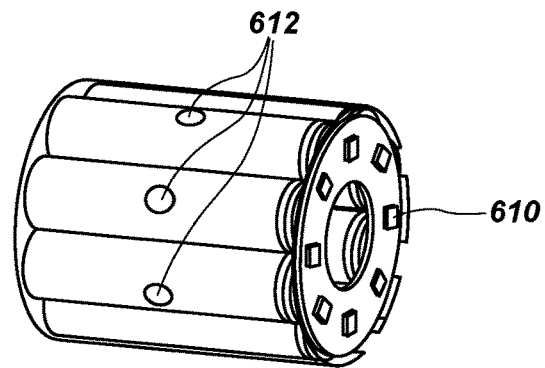
Figure 6C:
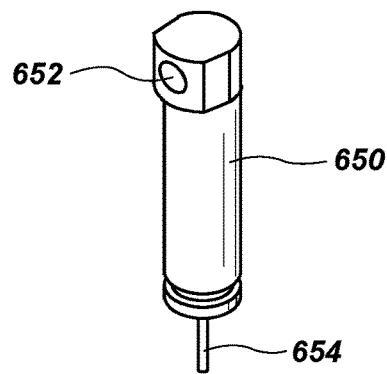

FIGS. 6A-6C illustrate various propulsion and thruster elements that may be included with one or more embodiments of the present disclosure. FIG. 6A illustrates a nose thruster module 620 with four nose thrusters 622 (two are hidden) arranged around a periphery of the nose thruster module 620. These nose thrusters 622 (also referred to herein as alignment thrusters 622) are positioned to generate a perpendicular force on the eject vehicle 400 relative to the longitudinal axis and are offset from the center of mass of the eject vehicle 400 so that an initial pitch maneuver can be performed to rotate and align the longitudinal axis of the eject vehicle 400 along an intercept vector pointed toward the aerial threat 120. In this embodiment, the four nose thrusters are orthogonally arranged giving two opportunities to adjust the pitch of the eject vehicle 400 in each direction. Of course, other embodiments may include fewer or more alignment thrusters 622.

FIG. 6B illustrates a divert thruster module 610 with eight divert thrusters 612 (five are hidden) arranged around a periphery of the divert thruster module 610. These divert thrusters 612 are positioned to generate a perpendicular force on the eject vehicle 400 relative to the longitudinal axis and are positioned near the center of mass of the eject vehicle 400 so that the divert thrusters will move the eject vehicle 400 laterally to a slightly different travel path while substantially maintaining the same pitch. Thus, the divert thrusters 612 can modify the flight path of the eject vehicle 400 to correct for minor errors in the initial pitch maneuvers pointing directly toward the aerial threat. In this embodiment, eight divert thrusters 612 are used giving eight opportunities to adjust the flight path of the eject vehicle 400 during its flight toward the aerial threat 120. Of course, other embodiments may include fewer or more divert thrusters 612.

FIG. 6C illustrates a thruster 650 configured to expel a gas through a nozzle 652 to create a lateral force. The thruster 650 may be controlled from a thrust signal 654, which may be connected to the electronics module 450 of the eject vehicle 400. The thruster 650 is one example of a type of thruster that may be used for both the divert thrusters 612 and the alignment thrusters 622.

Figure 7:
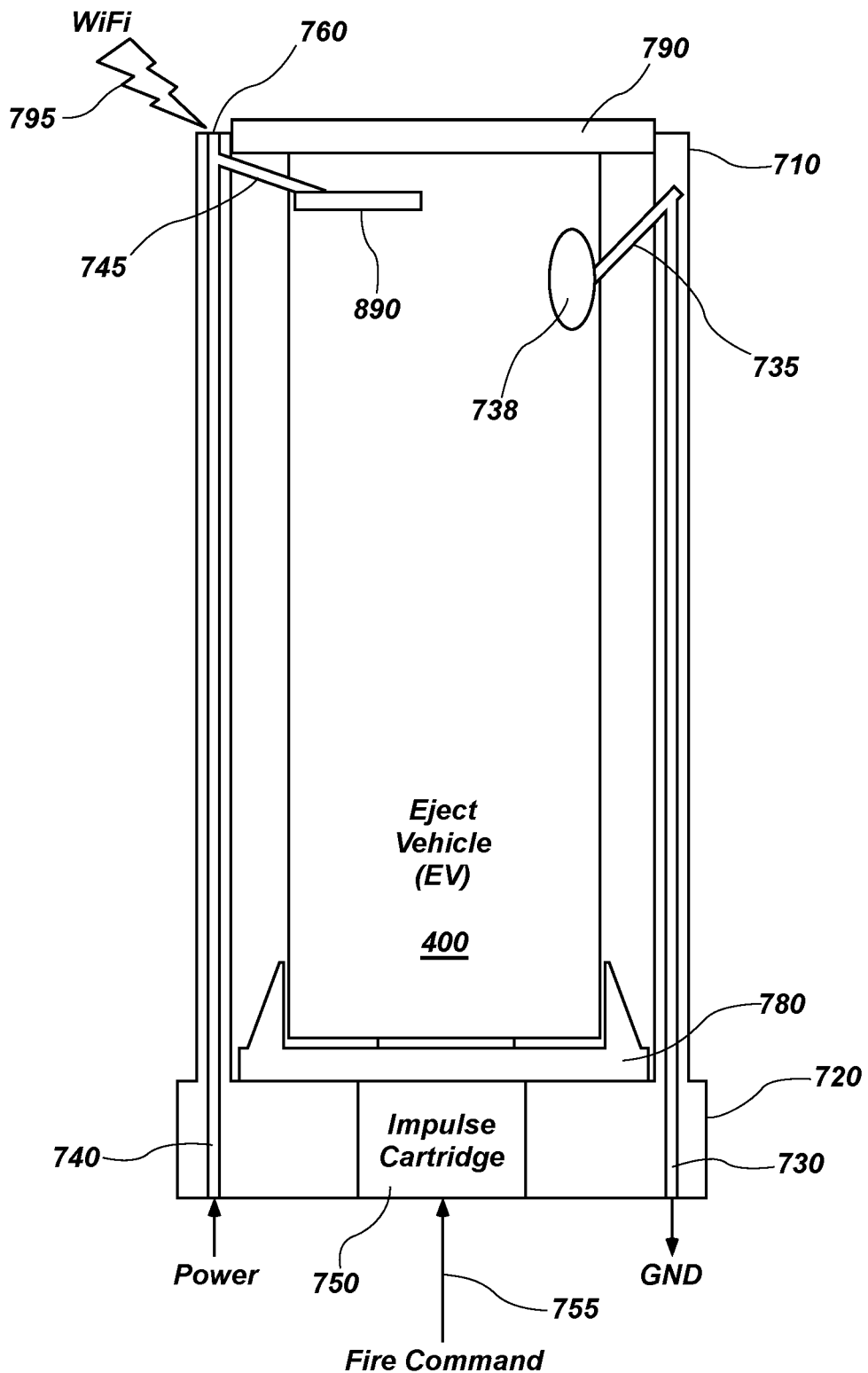
FIG. 7 illustrates various electrical and communication connections that may be present on an EV while it is disposed on the mobile platform prior to launch.

FIG. 7 illustrates various electrical and communication connections that may be present on the eject vehicle 400 while it is disposed on the aerial platform 100 prior to launch. A cartridge 710 includes a cartridge flange 720 such that the cartridge 710 may be securely placed in a dispenser 200 (FIG. 2). An end cap 790 may be positioned over the cartridge 710 to hold the eject vehicle 400 within the cartridge 710. An impulse cartridge 750 is positioned near the base of the cartridge flange 720 and is configured to fire in response to a fire command signal 755 from the radar module 900 (FIG. 3) or other electronics on the aerial platform 100. An ejection piston 780 is positioned between the impulse cartridge 750 and the eject vehicle 400 and is configured to transmit the energy of the firing impulse cartridge 750 to the eject vehicle 400 and propel the eject vehicle 400 out of the dispenser 200 and safely away from the aerial platform 100.

A power signal 740 and a ground signal 730 may run along or through the cartridge to an antenna spring contact 745 and a ground spring contact 735, respectively. The ground spring contact 735 is configured to flexibly couple with a ground patch 738 on the eject vehicle 400 to provide a ground for the eject vehicle 400 electronics while the eject vehicle 400 is in the cartridge 710. The antenna spring contact 745 is configured to flexibly couple with the antenna 890 on the eject vehicle 400 and a power signal on the eject vehicle 400 to provide power and direct communication for the eject vehicle 400 electronics while the eject vehicle 400 is in the cartridge 710. The cartridge 710 may include a cartridge antenna 760 that may be coupled to the antenna 890 of the eject vehicle 400 by the antenna spring contact 745. Thus, the eject vehicle 400 may communicate wirelessly 795 with electronics on board the aerial platform 100 through the antenna 890 on the eject vehicle 400 or through the cartridge antenna 760.

Figure 8:
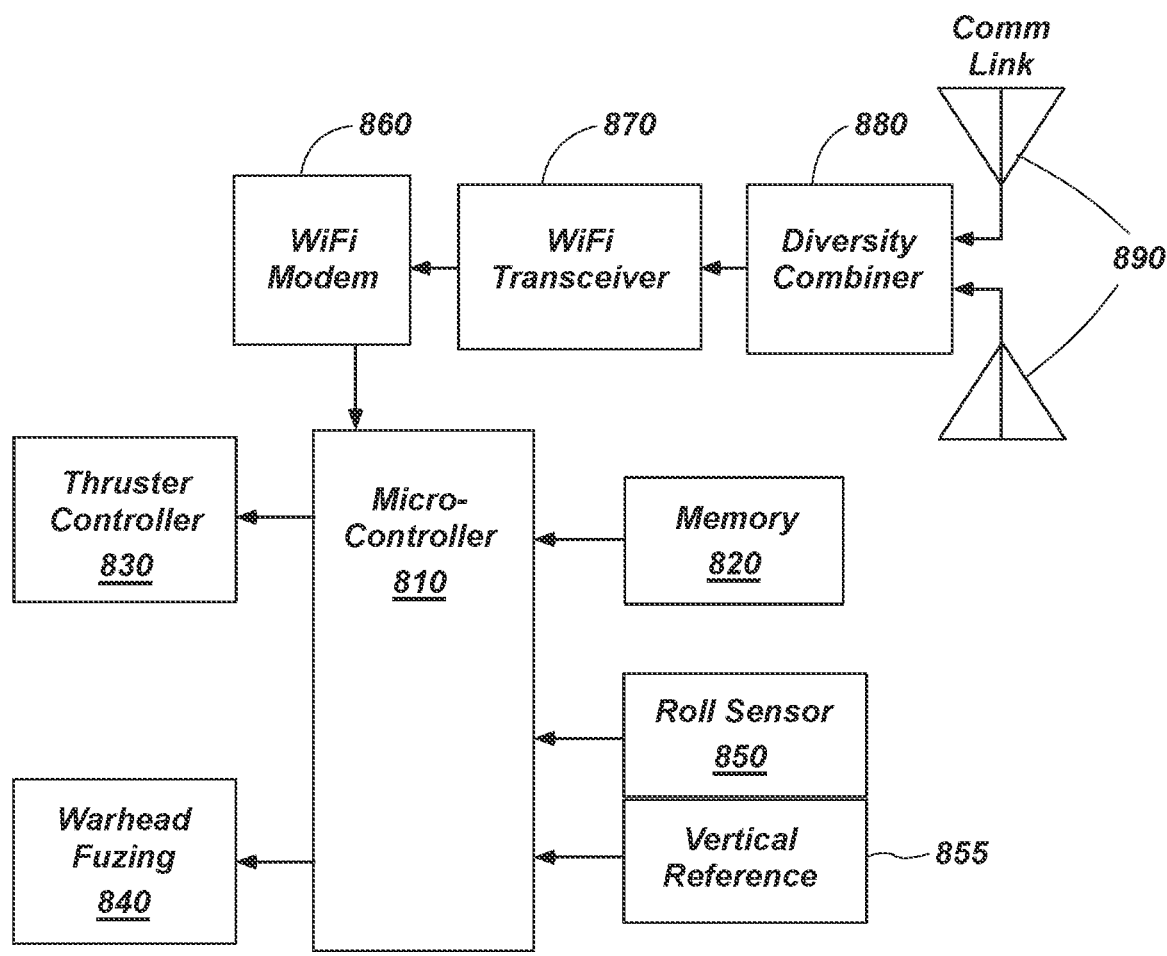
FIG. 8 is a block diagram illustrating elements that may be present on the eject vehicle according to one or more embodiments of the present disclosure.

FIG. 8 is a block diagram illustrating elements that may be present on the eject vehicle 400 according to one or more embodiments of the present disclosure. A microcontroller 810 may be coupled to a memory 820, which is configured to hold instructions for execution by the microcontroller 810 and data related to command and control of the eject vehicle 400. The microcontroller 810 may be any suitable microcontroller, microprocessor, or custom logic configured to directly execute, or execute responsive to software instructions, processes related to operation of the eject vehicle 400. The memory may be any suitable combination of volatile and non-volatile memory configured to hold data and computing instructions related to operation of the eject vehicle 400.

One or more antennas 890 may be configured to provide a communication link with electronics (e.g., the radar module 900) onboard the aerial platform 100. As non-limiting examples, the communication link may be configured using WiFi or WiMax frequencies and protocols. A diversity combiner 880 may be used to combine signals from multiple antennas.

A communication transceiver 870 (e.g., a WiFi transceiver) may be coupled to the diversity combiner 880 and be configured to transmit and receive frequencies to and from the diversity combiner 880. A communication modem 860 (e.g., a WiFi modem) may be coupled to the communication transceiver 870 and be configured to package and modulate communication information for communication transmission as well as demodulate and extract information from communication reception. The microcontroller 810 receives information from the communication modem 860 and may perform operation related to the received information. In addition, based on processes performed on the microcontroller 810, information may be sent to the communication modem 860 for transmission through the one or more antennas 890.

The microcontroller 810 may be coupled to a thruster controller 830, which interfaces with the alignment thrusters 622 and the divert thrusters 612 (FIG. 6). A warhead fuzing interface 840 may be provided to interface to the warhead 440 (FIG. 4), the safe and arm module 460 (FIG. 4) or a combination thereof, for arming and control of detonation of the warhead 440.

A roll sensor 850 and a vertical reference 855 may be used in combination to determine the attitude of the eject vehicle 400 as well as a spin rate and spin position of the eject vehicle 400 and communicate such information to the microcontroller 810. Other types of sensors, such as, for example, accelerometers and magnetometers may also be used for this purpose.

Figure 9A:
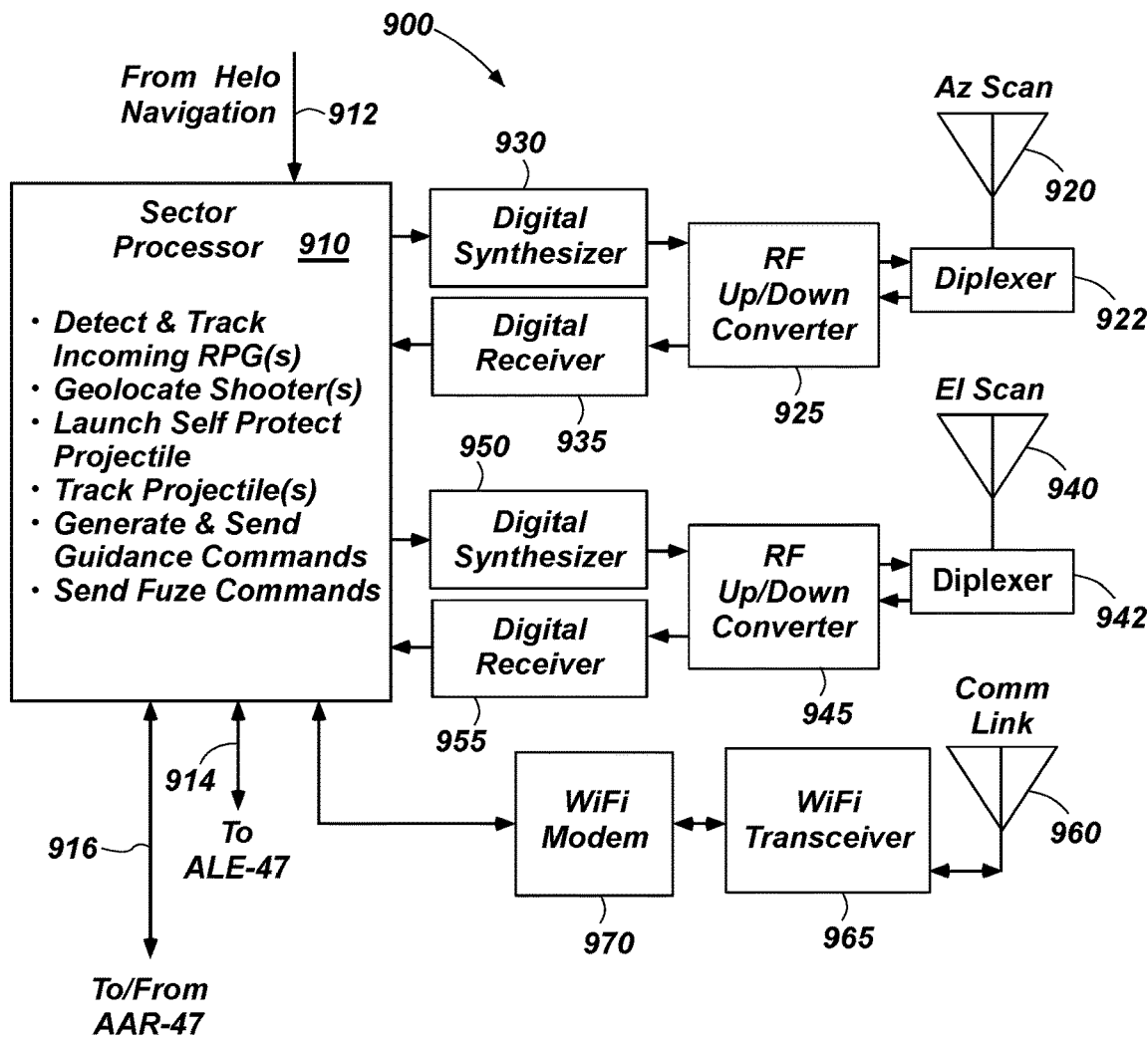
FIG. 9A is a block diagram illustrating elements that may be present on the aerial platform according to one or more embodiments of the present disclosure.
Figure 9B:
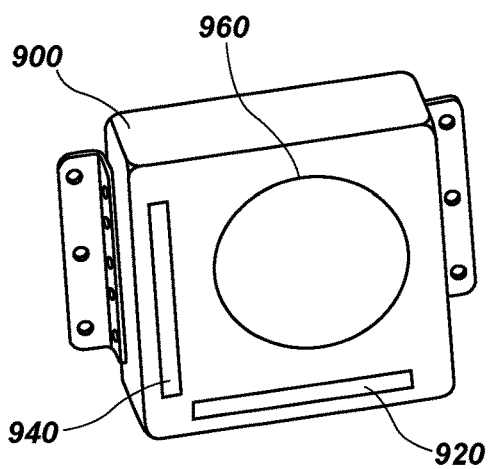
FIG. 9B is a perspective view of a radar module that may be present on the aerial platform according to one or more embodiments of the present disclosure.

FIG. 9A is a block diagram illustrating elements that may be present on the aerial platform 100 according to one or more embodiments of the present disclosure. The electronics module and functions thereof on the aerial platform 100 may be contained within a radar module 900, as illustrated in FIG. 9B. Alternatively, some of the function may be within the radar module 900 while other functions may be located in different places on the aerial platform 100 such as, for example, the central processor 360 (FIG. 3). The various modules used to control the radar module 900 and the eject vehicle 400 and determine other information related thereto may be collectively referred to herein as an onboard system.

FIG. 9B is perspective view of the radar module 900 that may be present on the aerial platform according to one or more embodiments of the present disclosure. The radar module 900 includes an azimuth scan radar antenna 920, an elevation scan radar antenna 940, and a wireless communication link antenna 960.

The azimuth scan radar antenna 920 is included in an azimuth radar subsystem, which includes a diplexer 922 for combining radar sent and reflected radar received. A Radio Frequency (RF) up/down converter 925 converts the radar frequencies sent from a digital synthesizer 930 and converts the radar frequencies received for use by a digital receiver 935.

The elevation scan radar antenna 940 is included in an elevation radar subsystem similar to the azimuth radar subsystem, but configured for the elevation direction. The elevation radar subsystem includes a diplexer 942 for combining radar sent and reflected radar received. A Radio Frequency (RF) up/down converter 945 converts the radar frequencies sent from a digital synthesizer 950 and converts the radar frequencies received for use by a digital receiver 955.

The wireless communication link antenna 960 may be configured to provide a communication link with electronics onboard the eject vehicle 400. As non-limiting examples, the communication link may be configured using WiFi or WiMax frequencies and protocols. A wireless communication subsystem includes a communication transceiver 965 (e.g., a WiFi transceiver) coupled to the wireless communication link antenna 960 and configured to transmit and receive frequencies to and from the antenna 960. A communication modem 970 (e.g., a WiFi modem) may be coupled to the communication transceiver 965 and be configured to package and modulate communication information for communication transmission as well as demodulate and extract information from communication reception.

A sector processor 910 communicates with the elevation radar subsystem, the azimuth radar subsystem, and the wireless communication subsystem. The sector processor 910 may communicate helicopter navigation information 912 from other electronics on the aerial platform 100. Referring also to FIG. 3, the sector processor 910 may also communicate with the dispenser 200 (e.g., one or more ALE-47s) using communication signal 914 and the missile approach warning system (MAWS) 320 (e.g., one or more AAR-47s) using communication signal 916. The sector processor 910 performs a number of functions to detect and track aerial threats 120, control and track the eject vehicle 400, as well as other functions related to the active protection system. In some embodiments, communication between the dispenser 200 and the sector processor 910 may be accomplished through the missile approach warning system (MAWS) 320.

The sector processor 910 in combination with the radar subsystems can detect and track incoming aerial threats 120 (e.g., RPGs). Based on the tracking of the incoming aerial threat, and in combination with navigation information from the aerial platform, the sector processor can extrapolate to a geo-location of the attacker 110, from where the aerial threat was launched. The aerial platform may act on this geo-location or transmit the geo-location to other aerial platforms or ground based platforms for follow-up actions.

The sector processor 910 may be configured to send launch commands to the dispenser 200 on communication signal 914 to launch one or more eject vehicles 400 to intercept one or more detected aerial threats 120. The sector processor 910 may also calculate required pitch adjustments that should be performed by the eject vehicle 400 after it has been ejected and is safely away from the aerial platform 100.

Once the eject vehicle 400 is launched, the sector processor 910 may be configured to track the eject vehicle 400 and send guidance commands (i.e., divert commands) to the eject vehicle 400 so the eject vehicle 400 can perform divert maneuvers to adjust its flight path toward the aerial threat 120. The sector processor 910 may also be configured to determine when the eject vehicle 400 will be near enough to the aerial threat 120 to destroy the aerial threat 120 by detonation of the warhead 440 on the eject vehicle 400. Thus, a detonation command may be sent to the eject vehicle 400 instructing it to detonate, or instructing it to detonate at a detonation time after receiving the command.

Figure 10A:
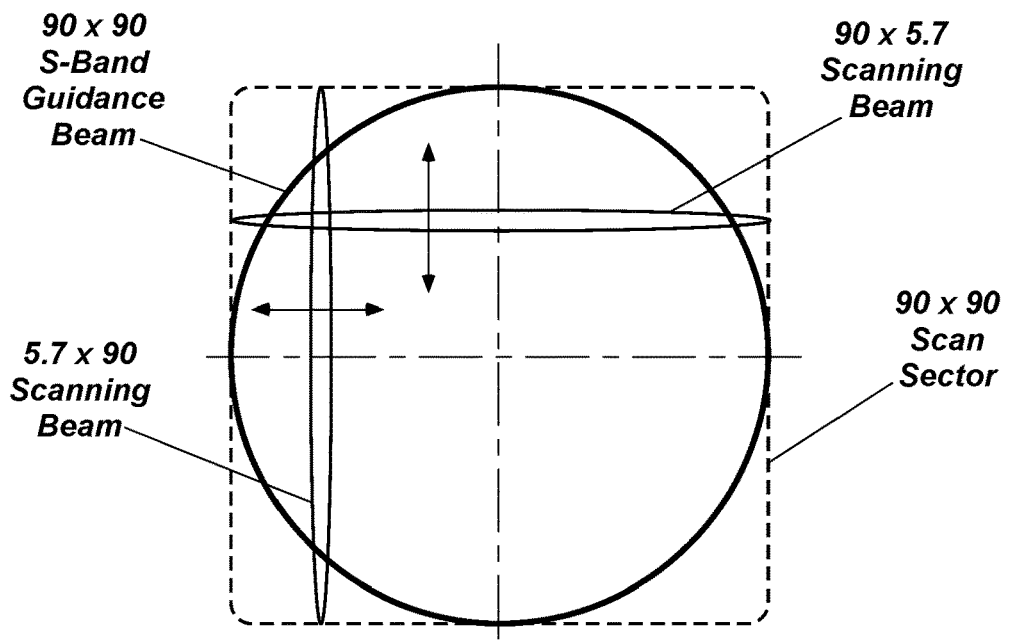
FIGS. 10A and 10B are diagrams illustrating radar scanning beams during an acquisition mode and a tracking mode, respectively.
Figure 10B:
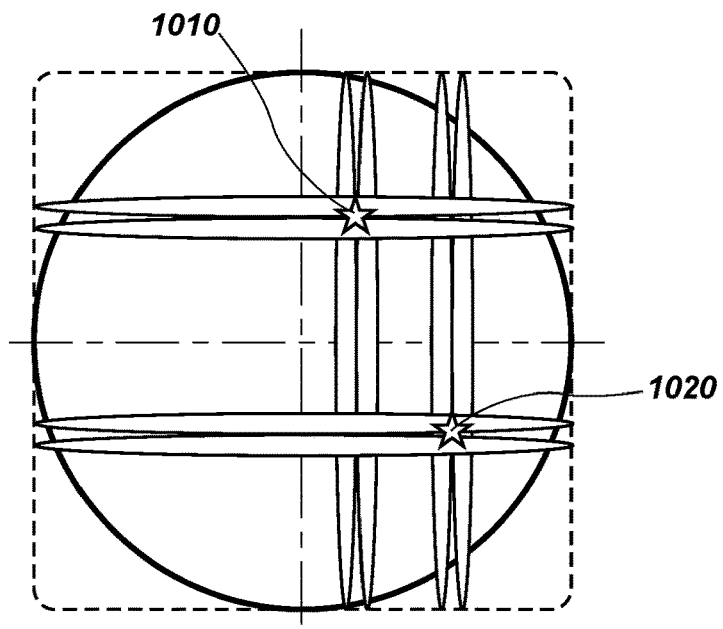

FIGS. 10A and 10B are diagrams illustrating radar scanning beams during an acquisition mode and a tracking mode, respectively. Referring to FIGS. 10A, 10B, 9, and 3, the radar modules 900 may be mounted in close proximity to the existing AN/ALR-47 missile warning receiver (MWR) installations to provide 360 degrees spatial coverage while minimizing wiring modifications to the helicopter. It is anticipated that an aerial threat 120 will be launched at relatively short ranges, typically on the order of 100 m. The radar modules 900 are designed to detect and track the low radar cross section (typically −15 dBsm) of an RPG fired from any aspect angle, within 30 milliseconds of launch, and out to a range of at least 300 meters. The radars operate in the Ka-Band to minimize the antenna size yet provide the precision angular measurements needed to guide the eject vehicle 400 to intercept the aerial threat 120. A high pulse-repetition-frequency pulse Doppler waveform provides radial velocity measurements as well as the clutter rejection needed to operate in close proximity to the ground while detecting low radar cross section targets. Pulse compression may be used to achieve precision range measurements as well as increasing the transmit duty cycle to best utilize the capabilities of existing Ka-Band solid-state power amplifiers. The antennas generate a pair of orthogonal fan beams, providing a continuous track-while-scan capability to minimize detection latency and provide multiple target track capability. Beam scanning can be accomplished using a frequency scan method to eliminate the need for expensive phase shifters.

FIG. 10A illustrates an acquisition mode wherein the elevation radar generates an elevation fan beam extending in the vertical direction that sweeps in the horizontal direction and the azimuth radar generates an azimuth fan beam extending in the horizontal direction that sweeps in the vertical direction. Thus, an entire 90-degree scan sector can be covered by the radar systems to quickly detect and acquire an incoming aerial threat 120 when it is within range.

FIG. 10B illustrates a track mode. In FIG. 10B, two sequential azimuth scans and two sequential elevation scans are shown that pinpoint a first location 1010 of the eject vehicle 400. In addition, two sequential azimuth scans and two sequential elevation scans are shown that pinpoint a second location 1020 of the aerial threat 120. With this location information, the sector processor can derive relative position information that can be used to provide divert commands to the eject vehicle 400 to more closely intercept the aerial threat 120.

Figure 11:
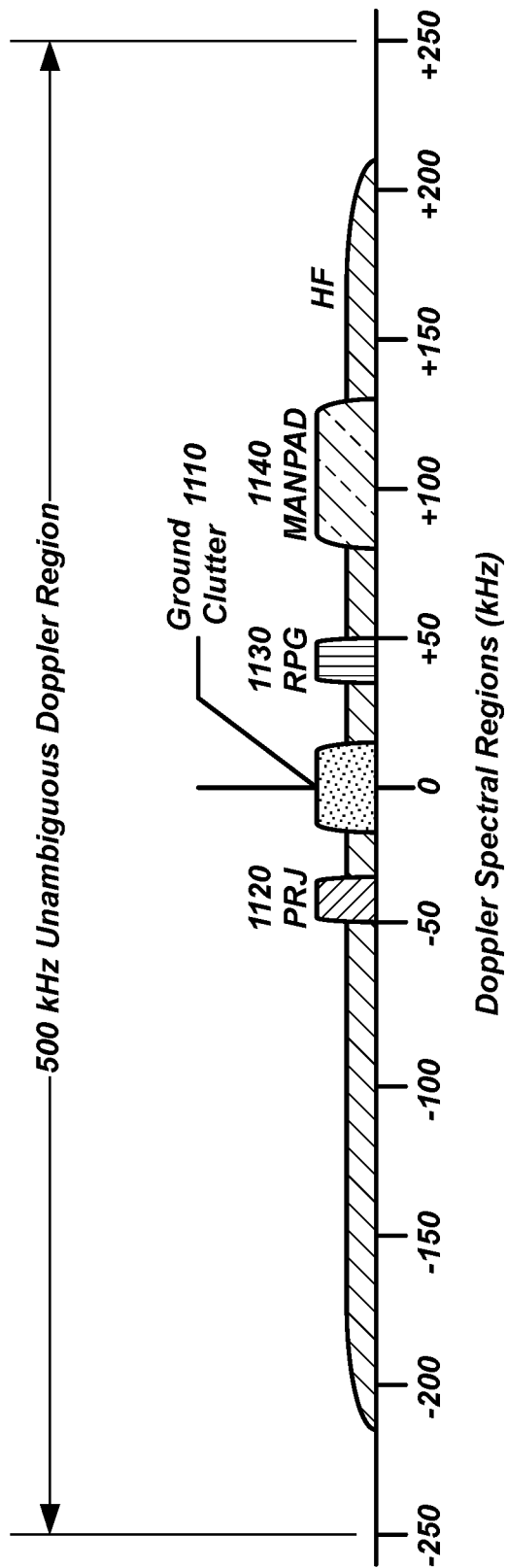
FIG. 11 is a spectrum diagram illustrating possible Doppler spectrum regions where various aerial vehicles may be detected.

FIG. 11 is a spectrum diagram illustrating possible Doppler spectrum regions where various aerial vehicles may be detected. As non-limiting examples, FIG. 11 illustrates a ground clutter spectrum 1110, a spectrum 1120 for the eject vehicle 400 (i.e., PRJ in FIG. 11), a spectrum 1130 that may be indicative of an RPG, and a spectrum 1140 that may be indicative of a MANPAD. Of course, other aerial threats and their associated spectrums may also be identified.

Figure 12:
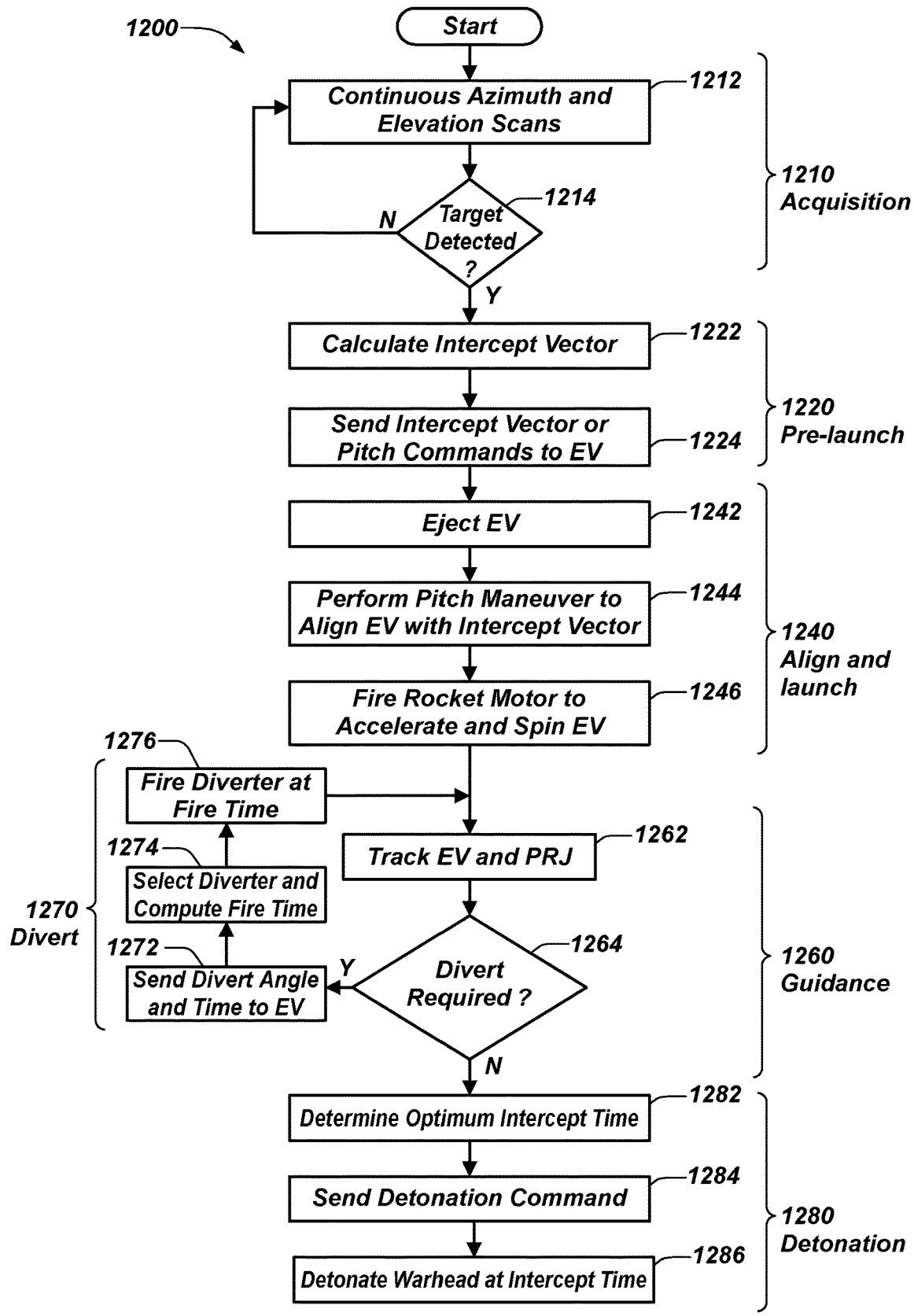
FIG. 12 is a simplified flow diagram illustrating some of the processes involved in one or more embodiments of the present disclosure.

FIG. 12 is a simplified flow diagram illustrating some of the processes 1200 involved in one or more embodiments of the present disclosure. The processes may be loosely considered as an acquisition phase 1210, a pre-launch phase

1220, an align and launch phase 1240, a guidance phase 1260, a divert phase 1270, and a detonation phase 1280.

Operation block 1212 indicates that continuous radar scans are performed looking for incoming aerial threats. Decision block 1214 indicates that the process loops until a target is detected. While not shown, during this phase the radar modules 900 may also be detecting distance and angle to wingman platforms (i.e., other aerial platforms) in the vicinity. Using communication between the various wingman platforms, sectors of responsibility can be identified as discussed more fully below in connection with FIG. 14.

If a target is detected, the process 1200 enters the prelaunch phase 1220. Operation block 1222 indicates that the sector processor 910 uses the range and travel direction of the incoming aerial threat 120 to calculate a threat direction to the incoming aerial threat 120 and an intercept vector pointing from a deployed eject vehicle 400 to a projected intercept point where the eject vehicle 400 would intercept the incoming aerial threat 120. Operation block 1224 indicates that the intercept vector is sent to the eject vehicle 400. The intercept vector may be sent to the eject vehicle 400 in a number of forms. The actual directional coordinates may be sent and the eject vehicle 400 would be responsible for determining the proper pitch maneuvers to perform. Alternatively, the sector processor 910 may determine the proper pitch maneuvers that the eject vehicle 400 should perform after launch and send only pitch commands (e.g., start and burn times for each alignment thruster 622) to be used during the pitch maneuvers. While FIG. 12 indicates that the intercept vector or pitch commands are sent before launch, some embodiments may be configured such that this information can be sent after launch.

During the acquisition phase 1210 and pre-launch phase 1220, the eject vehicle 400 remains in the dispenser 200 and connected to power. An RF communication link may be in operation through the eject vehicle 400 antenna via a transmission line inside the dispenser 200.

The process enters the align and launch phase 1240 after the intercept vector is determined. Operation block 1242 indicates the impulse cartridge 750 is fired to propel the eject vehicle 400 from the dispenser 200 and safely away from the aerial platform 100.

Operation block 1244 indicates that the pitch maneuvers are performed to align the eject vehicle 400 with the already determined intercept vector. The pitch maneuver is a two-stage process that sequentially executes an azimuth rotation and an elevation rotation to align the longitudinal axis of the eject vehicle along the intercept vector. The pitch maneuver does not have to be exact. As a non-limiting example, offsets of up to about 10 to 15 degrees may be corrected during flight of the eject vehicle 400 using the divert thrusters 612 during the guidance phase 1260. After ejection, the folding fins 482 will deploy and the communication link antennas 890 will deploy and wireless communication between the eject vehicle 400 and the radar module 900 may commence.

Operation block 1246 indicates that the rocket motor 420 will fire, which accelerates the eject vehicle 400 to about 160 meters/second and imposes a spin rate on the eject vehicle 400 of about 10 Hertz. Upon exhaustion, the rocket motor 420 and folding fins 482 will separate and the Terminal Vehicle (TV) is exposed. With separation of the TV, the second set of folding fins 484 deploy and the corner reflector 470 is exposed.

During the guidance phase 1260, the process will perform a track and divert loop in order to adjust the flight path of the eject vehicle 400 to more closely intercept the aerial threat 120. Operation block 1262 indicates that the sector processor 910 will track the eject vehicle 400 and aerial threat 120 as discussed above with reference to FIGS. 9A-10B. Decision block 1264, indicates that the sector processor 910 will determine if a divert maneuver is required to intercept the incoming aerial threat 120 and estimate the direction of divert thrust required.

A divert phase 1270 includes operations to cause the eject vehicle 400 to modify its course. Operation block 1272 indicates that the divert direction and time, if required, are sent to the eject vehicle 400.

The divert process takes into account the rotation of the eject vehicle 400 and the direction of the desired divert thrust. This rotation adds a complication to the selection and fire time determination of the proper divert thruster 612, but also ensures that all of the available divert thrusters 612 can be used to divert the eject vehicle 400 in any desired direction substantially perpendicular to the travel direction of the eject vehicle 400. Operation block 1274 indicates that the processor on the eject vehicle 400 will select the divert thruster to be fired and determine the firing time based on the divert angle received from the sector processor and its internal attitude sensors.

Operation block 1276 indicates that the appropriate divert thruster 612 is fired at the appropriate fire time to move the eject vehicle 400 laterally along a diversion vector to adjust the flight path of the eject vehicle 400. As a non-limiting example, each divert thruster 612 may be capable of correcting for about two degrees of error from the initial pointing of the eject vehicle 400 during the pitch maneuver. Thus, when the divert thrusters 612 are fired when the eject vehicle is in the correct rotational position, the process can slide the travel direction vector of the eject vehicle 400 toward the path of the aerial threat 120. Moreover, the process can fire in any circular direction and can fire multiple divert thrusters 612 in the same direction to repeatedly move the eject vehicle 400 in the same direction.

While FIG. 12 indicates the guidance phase 1260 and the detonation phase 1280 as operating sequentially, they also may operate in parallel. During the detonation phase 1280, operation block 1282 indicates that the sector processor 910 determines an optimum intercept time when the eject vehicle 400 will be at its closest point to the aerial threat 120. Operation block 1284 indicates that a detonation command may be sent to the eject vehicle 400. This detonation command may be in the form of a detonation time for the eject vehicle to count out or it may be in the form of an immediate command for the eject vehicle 400 to perform as soon as the command is received.

Operation block 1286 indicates that the warhead 440 on the eject vehicle 400 is detonated at the intercept time responsive to the detonation command received from the sector processor 910.

Figure 13:
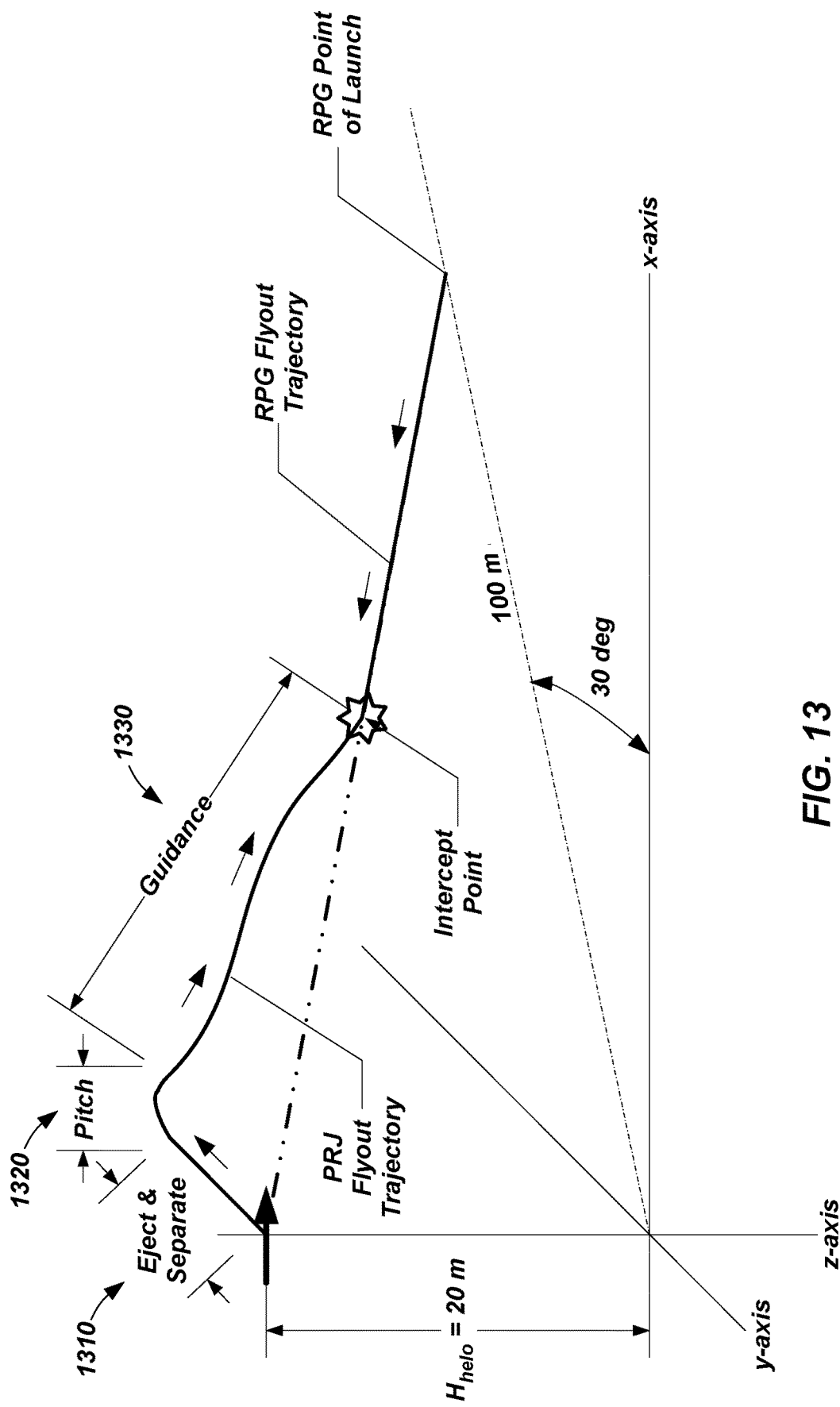
FIG. 13 illustrates an example flight path for the eject vehicle and an aerial threat during an intercept process.

FIG. 13 illustrates an example flight path for the eject vehicle 400 and an aerial threat 120 during an intercept process. In this example, a typical RPG and EV trajectory example are shown. The RPG is launched at a range of about 100 meters and 30 degrees left of the nose of the helicopter. The eject vehicle 400 receives its coordinate commands from the radar module 900 and is then ejected from the port chaff dispenser 200 at an angle of 90 degrees to the helicopter axis.

During period 1310, the eject vehicle 400 separates to a distance of about two meters from the helicopter. During period 1320, the nose thrusters pitch the eject vehicle 400 to the approximate approach angle of the incoming RPG (e.g., within about ±10° accuracy). The rocket motor 420 then fires to accelerate the eject vehicle 400 to approximately 160 meters/second and is then separated from the remaining terminal vehicle upon exhaustion.

During period 1330, the radar module 900 transmits a series of divert commands to the eject vehicle 400, which fires the divert thrusters 612 to correct the trajectory of the eject vehicle 400 and intercept the RPG. A radar command is finally sent to the eject vehicle 400 to detonate the warhead 440 when the terminal vehicle reaches the closest point of approach (CPA). The guidance algorithm may be configured to produce a maximum CPA of about 30 centimeters, which is well within the lethal 0.6-meter kill radius of the warhead 440.

Figure 14:
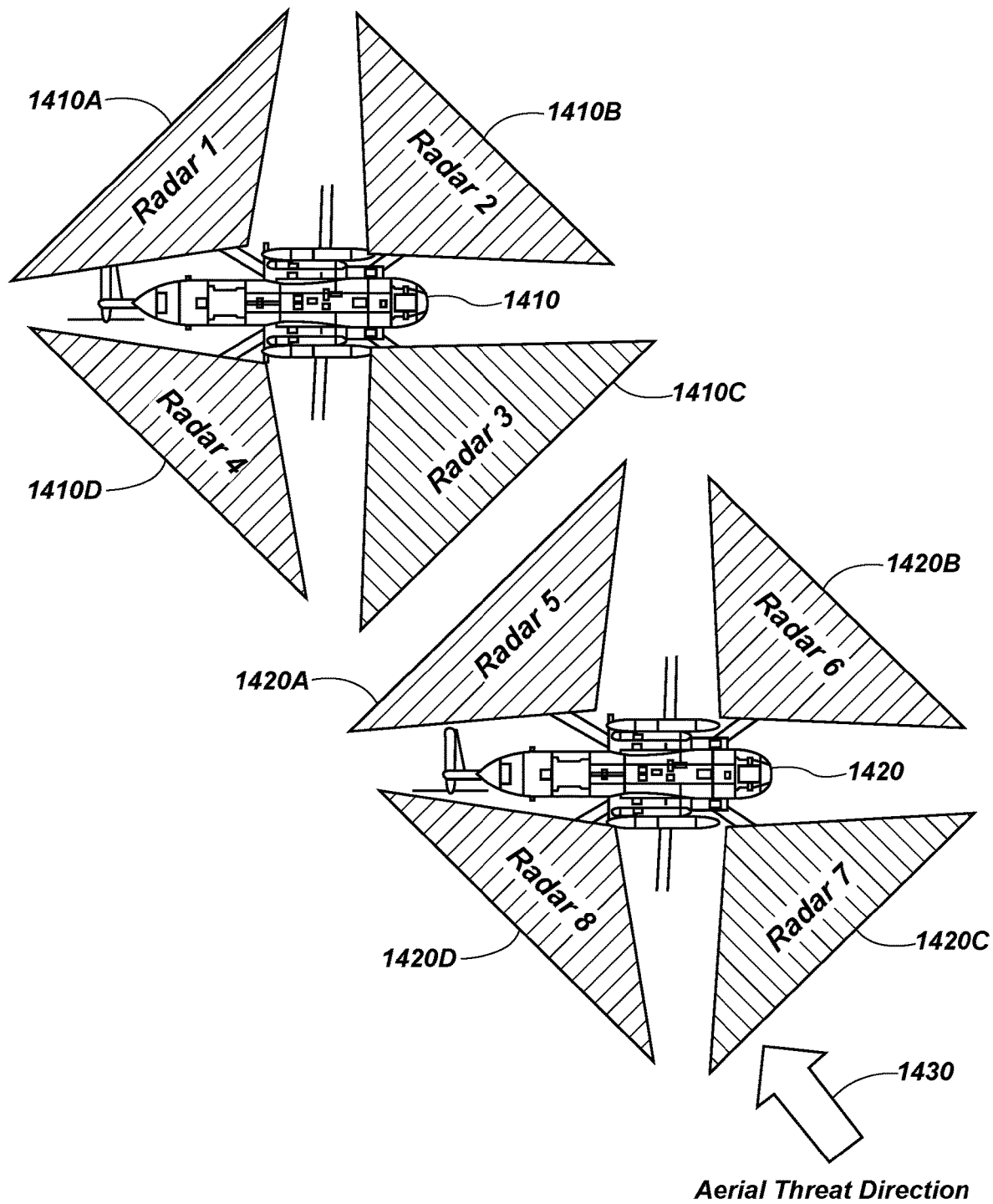
FIG. 14 illustrates two aerial vehicles flying in a formation and various radar sectors that may be covered by the aerial vehicles.

FIG. 14 illustrates two aerial vehicles flying in a formation and various radar sectors that may be covered by the aerial vehicles. A significant concern is the presence of wingman helicopters and the potential damage caused by accidental targeting. The system presented has capability of tracking and recognizing the adjacent helicopters and networking with their associated active protection systems to avoid collateral damage by handing off sectors covered by other platforms. In FIG. 14, a first helicopter 1410 is monitoring a first radar sector 1410A, a second radar sector 1410B, a third radar sector 1410C, and a fourth radar sector 1410D.

A second helicopter 1420 near the first helicopter 1410 is monitoring a fifth radar sector 1420A, a sixth radar sector 1420B, a seventh radar sector 1420C, and an eighth radar sector 1420D. If an aerial threat approaches form a direction indicated by arrow 1430 it may be detected by the third radar sector 1410C of the first helicopter 1410 and the seventh radar sector 1420C of the second helicopter 1420. If the first helicopter 1410 attempts to launch an eject vehicle, it may cause damage to the second helicopter 1420. However, using communication between the various wingman platforms, sectors of responsibility can be identified. Thus, for the direction indicated by arrow 1430, the first helicopter 1410 can determine that the third radar sector 1410C will be covered by the seventh radar sector 1420C of the second helicopter 1420. As a result, while this formation continues, the first helicopter does not respond to threats in its third radar sector 1410C.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method of controlling a vehicle, comprising:
   releasing a vehicle from a carrier disposed on a platform;
   subsequent to releasing the vehicle, causing the vehicle to substantially align along a vector via a pitch maneuver, the vehicle comprising an airframe and a motor;
   causing the motor of the vehicle to fire after causing the vehicle to substantially align along the vector via the pitch maneuver;
   causing the vehicle to accelerate along a flight path substantially aligned with the vector;
   after causing the vehicle to accelerate along the flight path, causing the motor to detach and fins to deploy from the airframe of the vehicle; and
   receiving, at a controller of the airframe, data from one or more sensors mounted on the airframe; and
   adjusting, responsive to the received data, a flight path of the airframe.

2. The method of claim 1, wherein releasing the vehicle from the carrier comprises a first action of a launch sequence and causing the vehicle to substantially align along the vector via a pitch maneuver comprises a second action of the launch sequence.

3. The method of claim 1, further comprising causing the airframe to divert from the vector one or more times after detaching the motor to adjust a course of the airframe to align the airframe along an updated vector.

4. The method of claim 3, wherein causing the airframe to divert from the vector comprises firing one or more divert thrusters.

5. The method of claim 1, wherein causing the vehicle to substantially align along the vector via the pitch maneuver is performed after the vehicle is a certain distance away from the platform.

6. The method of claim 1, wherein releasing the vehicle from the carrier comprises releasing the vehicle in air deflected by the platform.

7. The method of claim 1, further comprising transmitting at least one communication to the airframe indicating a closest point of approach of the airframe and a target of interest.

8. The method of claim 7, further comprising receiving, from the airframe, data regarding a flight of the airframe at the closest point of approach of the vehicle and the target of interest.

9. An active protection system comprising an intercept vehicle carried by an aircraft, the active protection system comprising:
   a controller comprising:
   at least one processor; and
   at least one computer-readable storage medium storing instructions thereon that, when executed by the at least one processor, cause the active protection system to:
   deploy a first intercept vehicle from a platform and cause the first intercept vehicle to exit a vicinity of the platform;
   cause the first intercept vehicle to perform a pitch maneuver with a plurality of pitch thrusters of the first intercept vehicle to align the first intercept vehicle along an intercept vector pointed substantially toward a projected intercept point with an identified aerial threat after the first intercept vehicle exits the vicinity of the platform;
   cause the first intercept vehicle to perform a thrust maneuver with a rocket motor of the first intercept vehicle to accelerate the first intercept vehicle along the intercept vector;
   deploy a second intercept vehicle from the platform and align the second intercept vehicle along the intercept vector; and
   cause the second intercept vehicle to perform a thrust maneuver with a rocket motor of the second intercept vehicle to accelerate the second intercept vehicle along the intercept vector.

10. The active protection system of claim 9, further comprising instructions that, when executed by the at least one processor, cause the active protection system to cause one or more of the first intercept vehicle or the second intercept vehicle to perform a divert maneuver with one or more divert thrusters of one or more of the first intercept vehicle or the second intercept vehicle in order to divert one or more of the first intercept vehicle or the second intercept vehicle from the intercept vector one or more times to adjust a course of one or more of the first intercept vehicle or the second intercept vehicle.

11. The active protection system of claim 9, wherein deploying the first intercept vehicle comprises releasing the first intercept vehicle from a carrier disposed on the platform.

12. The active protection system of claim 9, wherein deploying the first intercept vehicle comprises releasing the first intercept vehicle from a carrier disposed on the platform into air deflected by the platform.

13. The active protection system of claim 9, wherein deploying the first intercept vehicle from the platform comprises deploying the first intercept vehicle from the platform selected from the group consisting of an aerial vehicle, a helicopter, an unmanned airborne vehicle (UAV), a remotely piloted vehicle (RPV), an aircraft, a light aircraft, a low speed aircraft, a hovering platform, a ground-based vehicle, a tank, an armored personnel carrier, and a personnel carrier.

14. The active protection system of claim 9, instructions that, when executed by the at least one processor, cause the active protection system to receive, from one or more of the first intercept vehicle or the second intercept vehicle, data regarding flight of one or more of the first intercept vehicle or the second intercept vehicle observed by sensors of one or more of the first intercept vehicle or the second intercept vehicle during the flight thereof.

15. The active protection system of claim 9, further comprising instructions that, when executed by the at least one processor, cause the active protection system to:
    transmit at least one communication to one or more of the first intercept vehicle or the second intercept vehicle indicating an updated intercept vector; and
    cause one or more of the first intercept vehicle or the second intercept vehicle to perform a divert maneuver to laterally divert the one or more of the first intercept vehicle or the second intercept vehicle to adjust a respective flight path to align the one or more of the first intercept vehicle or the second intercept vehicle along the updated intercept vector.

16. The active protection system of claim 9, further comprising instructions that, when executed by the at least one processor, cause the active protection system to:
    transmit at least one communication to one or more of the first intercept vehicle or the second intercept vehicle indicating a closest point of approach of one or more of the first intercept vehicle or the second intercept vehicle and the identified aerial threat; and
    cause one or more of the first intercept vehicle or the second intercept vehicle to detonate when one or more of the first intercept vehicle or the second intercept vehicle reaches the closest point of approach.

17. An active protection system comprising an intercept vehicle carried by an aircraft, the intercept vehicle comprising:
    alignment thrusters configured to rotate the intercept vehicle about an axis orthogonal to a longitudinal axis of the intercept vehicle to at least substantially align the longitudinal axis of the intercept vehicle with an intercept vector;
    a rocket motor configured to accelerate the intercept vehicle along the intercept vector after the intercept vehicle is aligned with the intercept vector;
    one or more sensors configured to acquire data regarding conditions during flight of the intercept vehicle;
    a controller operably coupled to the alignment thrusters, the rocket motor, and the one or more sensors, the controller comprising:
        at least one processor; and
        at least one computer-readable storage medium storing instructions thereon that, when executed by the at least one processor, cause the at least one processor to:
            receive data from the one or more sensors; and
            responsive to the received data, adjust a flight path of the intercept vehicle.

18. The active protection system of claim 17, wherein adjusting the flight path of the intercept vehicle comprising causing one or more divert thrusters to fire.

19. The active protection system of claim 17, further comprising divert thrusters configured to divert the intercept vehicle in a direction transverse to the flight path of the intercept vehicle.

20. The active protection system of claim 17, further comprising a carrier disposed on the aircraft, the carrier configured to carry the intercept vehicle.

21. The active protection system of claim 17, wherein the aircraft comprises an unmanned airborne vehicle, a light aircraft, a low speed aircraft, a remotely piloted vehicle, a helicopter, or a hovering platform.

22. The active protection system of claim 17, wherein aligning the intercept vehicle with the intercept vector includes a two-stage process configured to execute an azimuth rotation and an elevation rotation of the intercept vehicle.

23. The active protection system of claim 17, wherein the alignment thrusters are configured to rotate the longitudinal axis of the intercept vehicle while aligning the intercept vehicle with the intercept vector to be within an offset of less than about 15 degrees from the intercept vector.

24. The active protection system of claim 17, further comprising a sector processor on-board the aircraft configured to determine pitch commands for aligning the intercept vehicle with the intercept vector and transmit the pitch commands to the intercept vehicle prior to a launch of the intercept vehicle.

25. The active protection system of claim 17, further comprising a sector processor on-board the aircraft configured to determine pitch commands for aligning the intercept vehicle with the intercept vector and transmit the pitch commands to the intercept vehicle after a launch of the intercept vehicle.

26. An active targeting system, comprising an intercept vehicle configured to be released from a platform, the intercept vehicle comprising:
    alignment thrusters configured to rotate the intercept vehicle about an axis orthogonal to a longitudinal axis of the intercept vehicle to at least substantially align the longitudinal axis of the intercept vehicle with an intercept vector via a pitch maneuver;
    one or more sensors configured to acquire data regarding conditions during flight of the intercept vehicle; and
    a controller operably coupled to the alignment thrusters and the one or more sensors, the controller comprising:
        at least one processor; and
        at least one computer-readable storage medium storing instructions thereon that, when executed by the at least one processor, cause the at least one processor to:
            receive data from the one or more sensors; and
            responsive to the received data, adjust a flight path of the intercept vehicle.

27. The active targeting system of claim 26, further comprising:
- a rocket motor configured to accelerate the intercept vehicle along the intercept vector after the intercept vehicle performs the pitch maneuver;
- divert thrusters configured to divert the intercept vehicle in a direction transverse to a flight path of the intercept vehicle; and
- a heat generating payload.

28. The active targeting system of claim 26, further comprising a carrier disposed on the platform and carrying the intercept vehicle, wherein the intercept vehicle is configured to be released from the carrier.

29. The active targeting system of claim 26, wherein the platform is a mobile platform.

30. The active targeting system of claim 26, wherein the platform is a stationary platform.

31. The active targeting system of claim 26, further comprising at least one radar module disposed on the platform and configured to detect aerial threats.

32. The active targeting system of claim 31, wherein the at least one radar module is configured to transmit velocity and position information of the intercept vehicle to the intercept vehicle during flights of the intercept vehicle.

33. The active targeting system of claim 31, wherein the at least one radar module is configured to transmit velocity and position information of a detected aerial threat to the intercept vehicle during flights of the intercept vehicle.

34. A vehicle, comprising:
a controller comprising:
at least one processor; and
at least one computer-readable storage medium storing instructions thereon that, when executed by the at least one processor, cause the vehicle to:
- perform a first action of a launch sequence to leave a platform;
- perform a second action of the launch sequence after the first action of the launch sequence, the second action comprising performing a pitch maneuver with a plurality of pitch thrusters of the vehicle to align the vehicle along a vector pointed substantially toward a target; and
- perform a thrust maneuver with a rocket motor of the vehicle to accelerate the vehicle.

35. The vehicle of claim 34, further comprising instructions that, when executed by the at least one processor, cause the vehicle to perform a divert maneuver with one or more divert thrusters of the vehicle to divert the vehicle from the vector one or more times after commencement of accelerating the vehicle to adjust a course of the vehicle to align the vehicle along an updated vector.

36. The vehicle of claim 35, further comprising instructions that, when executed by the at least one processor, cause the vehicle to:
- receive at least one communication indicating an updated vector for the vehicle; and
- perform the divert maneuver to laterally divert the vehicle to adjust a flight path of the vehicle to align the vehicle along the updated vector.

37. The vehicle of claim 34, further comprising instructions that, when executed by the at least one processor, cause the vehicle to perform the second action of the launch sequence after the vehicle is a certain distance away from the platform.

38. The vehicle of claim 34, wherein the first action of the launch sequence comprises decoupling the vehicle from a carrier disposed on the platform.

39. The vehicle of claim 34, wherein the first action of the launch sequence comprises decoupling the vehicle from a carrier disposed on the platform into air deflected by the platform.

40. The vehicle of claim 34, further comprising instructions that, when executed by the at least one processor, cause the vehicle to:
- transmit at least one communication indicating a closest point of approach of the vehicle and the target; and
- detonate when the vehicle reaches the closest point of approach.

41. The vehicle of claim 34, further comprising instructions that, when executed by the at least one processor, cause the vehicle to transmit data regarding flight of the vehicle observed by sensors of the vehicle during flight of the vehicle.

42. The vehicle of claim 34, further comprising instructions that, when executed by the at least one processor, cause the vehicle to receive at least one communication indicating a closest point of approach of the vehicle and the target.

43. The vehicle of claim 42, further comprising instructions that, when executed by the at least one processor, cause the vehicle to transmit data regarding flight of the vehicle observed by sensors of the vehicle at the closest point of approach of the vehicle and the target.

* * * * *